US012406507B2

(12) United States Patent
Goetz et al.

(10) Patent No.: US 12,406,507 B2
(45) Date of Patent: Sep. 2, 2025

(54) TIME-DIVISION MULTIPLE ACCESS SCANNING FOR CROSSTALK MITIGATION IN LIGHT DETECTION AND RANGING (LIDAR) DEVICES

(71) Applicant: Waymo LLC, Mountain View, CA (US)

(72) Inventors: Georges Goetz, Mountain View, CA (US); James Dunphy, San Jose, CA (US); Augusto Tazzoli, San Jose, CA (US); David Schleuning, Piedmont, CA (US)

(73) Assignee: Waymo LLC, Mountain View, CA (US)

( * ) Notice: Subject to any disclaimer, the term of this patent is extended or adjusted under 35 U.S.C. 154(b) by 416 days.

(21) Appl. No.: 17/821,535

(22) Filed: Aug. 23, 2022

(65) Prior Publication Data

US 2024/0071093 A1    Feb. 29, 2024

(51) Int. Cl.
*G06V 20/58*    (2022.01)
*B60W 60/00*    (2020.01)

(52) U.S. Cl.
CPC ......... *G06V 20/58* (2022.01); *B60W 60/0015* (2020.02); *B60W 2420/408* (2024.01); *B60W 2554/4049* (2020.02)

(58) Field of Classification Search
CPC .............. G06V 20/58; B60W 60/0015; B60W 2420/408; B60W 2554/4049;
(Continued)

(56) References Cited

U.S. PATENT DOCUMENTS 10,203,399 B2    2/2019 Retterath et al.
10,379,540 B2    8/2019 Droz et al.
(Continued)

FOREIGN PATENT DOCUMENTS

JP    2011007616 A    1/2011
JP    2016-205953 A    12/2016
(Continued)

OTHER PUBLICATIONS

SPADs and SiPMs Arrays for Long-Range High-Speed Light Detection and Ranging (LiDAR), by Villa, Federica, Severini, Fabio, Madonini, Francesca, Zappa, Franco, Sensors (Basel, Switzerland), 21(11), 3839, Jun. 1, 2021 (Year: 2021).*

(Continued)

*Primary Examiner* — Nay A Maung
*Assistant Examiner* — Heath E. Wells
(74) *Attorney, Agent, or Firm* — McDonnell Boehnen Hulbert & Berghoff LLP

(57) ABSTRACT

Example embodiments relate to time-division multiple access scanning for crosstalk mitigation in light detection and ranging (lidar) devices. An example embodiment includes a method. The method includes emitting a first group of light signals into a surrounding environment. The first group of light signals corresponds to a first angular resolution. The method also includes detecting, during a first listening window, a first group of reflected light signals. Additionally, the method includes emitting a second group of light signals into the surrounding environment. The second group of light signals corresponds to a second angular resolution with respect to the surrounding environment. The second angular resolution is lower than the first angular resolution. Further, the method includes detecting a second group of reflected light signals from the surrounding environment. In addition, the method includes synthesizing, (Continued)

by a controller of the lidar device, a dataset usable to generate one or more point clouds.

20 Claims, 28 Drawing Sheets

(58) Field of Classification Search
CPC ...... G01S 7/4815; G01S 7/4876; G01S 7/497; G01S 13/865; G01S 13/867; G01S 13/931; G01S 17/86; G01S 17/931; G01S 7/481; G01S 7/483; G01S 17/10
USPC ......................................................... 382/104
See application file for complete search history.

(56) References Cited

U.S. PATENT DOCUMENTS

| | | |
|---|---|---|
| 10,627,492 B2 | 4/2020 | Shand |
| 10,754,033 B2 | 8/2020 | Shand |
| 10,830,878 B2 | 11/2020 | McMichael et al. |
| 10,871,779 B2 | 12/2020 | Templeton et al. |
| 10,942,244 B2 | 3/2021 | Droz |
| 11,156,717 B2 | 10/2021 | Lingg et al. |
| 2008/0082085 A1 | 4/2008 | Krasutksy |
| 2019/0086513 A1 | 3/2019 | Lipson et al. |
| 2019/0178974 A1* | 6/2019 | Droz .................... G01S 7/4815 |
| 2019/0195991 A1* | 6/2019 | Miki ..................... G01S 17/931 |
| 2020/0041622 A1 | 2/2020 | Juelsgaard |
| 2020/0142061 A1 | 5/2020 | Schultz et al. |
| 2020/0309955 A1* | 10/2020 | Laflaquière ............. G01S 17/10 |
| 2021/0239839 A1 | 8/2021 | Seliuchenko |
| 2022/0073035 A1* | 3/2022 | Onoda .................... B60S 1/603 |
| 2022/0120867 A1* | 4/2022 | Liang .................... G01S 7/4815 |
| 2022/0120906 A1 | 4/2022 | Pacala |

FOREIGN PATENT DOCUMENTS

| | | |
|---|---|---|
| JP | 2019-113530 A | 7/2019 |
| JP | 2019-144072 A | 8/2019 |
| JP | 2020073901 A | 5/2020 |
| JP | 2022-533119 A | 7/2022 |
| JP | 2022105771 A | 7/2022 |
| WO | 2021065138 A1 | 4/2021 |
| WO | 2021138709 A1 | 7/2021 |
| WO | 2022087384 A1 | 4/2022 |

OTHER PUBLICATIONS

"1.5 μm polarization coherent lidar incorporating time-division multiplexing"; Chong Wang, et al.; Optics Express, vol. 25, No. 17, pp. 20663-20674 (Aug. 21, 2017).

* cited by examiner

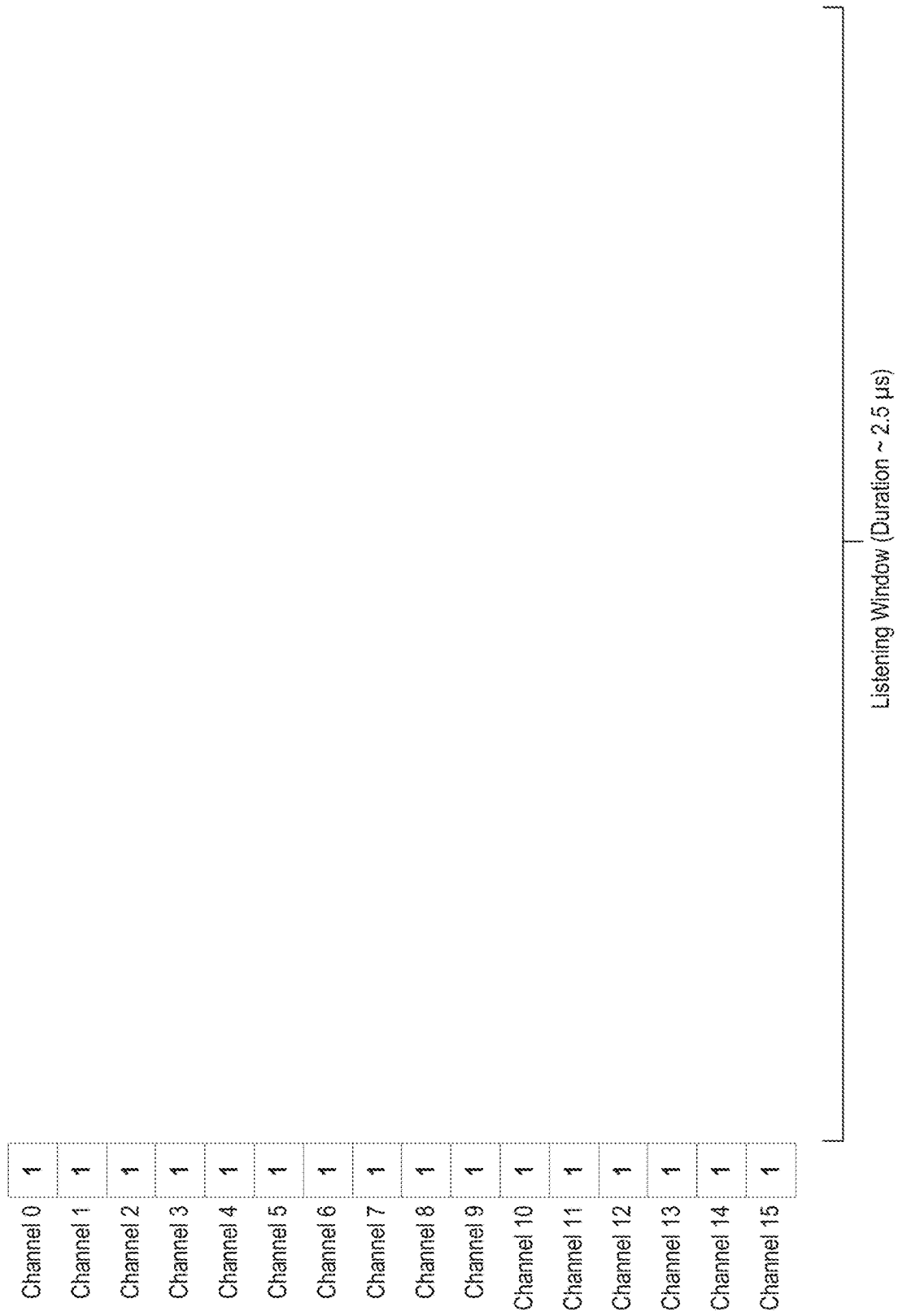

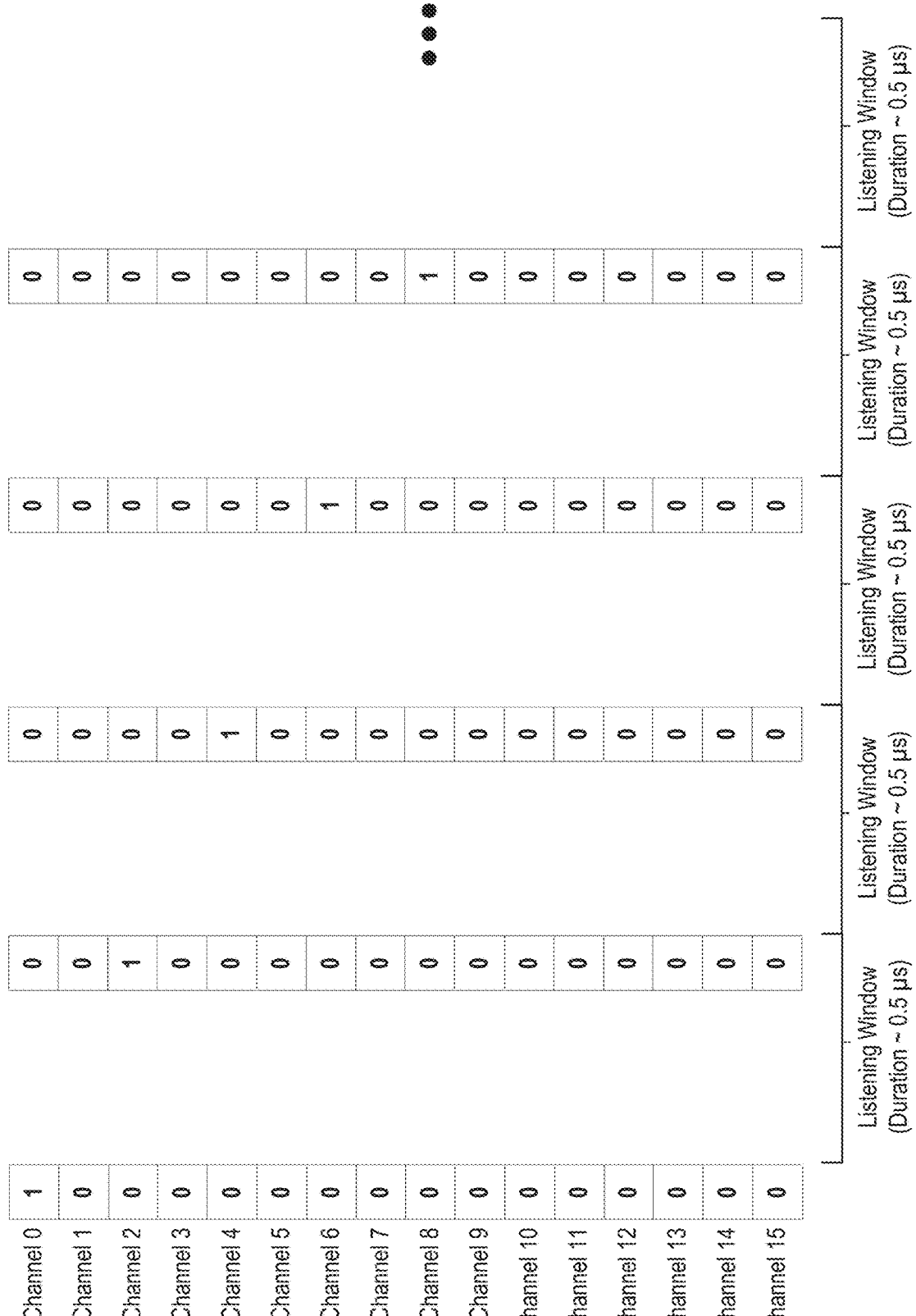

TIME-DIVISION MULTIPLE ACCESS SCANNING FOR CROSSTALK MITIGATION IN LIGHT DETECTION AND RANGING (LIDAR) DEVICES

BACKGROUND

Unless otherwise indicated herein, the description in this section is not prior art to the claims in this application and is not admitted to be prior art by inclusion in this section.

Autonomous vehicles or vehicles operating in an autonomous mode may use various sensors to detect their surroundings. For example, light detection and ranging (lidar) devices, radio detection and ranging (radar) devices, and/or cameras may be used to identify objects in environments surrounding autonomous vehicles. Such sensors may be used in object detection and avoidance and/or in navigation, for example.

SUMMARY

Embodiments described herein relate to mitigating crosstalk between detection channels in lidar devices. In particular, example embodiments include performing two emission cycles with two corresponding detection cycles. During the first cycle, all the light emitters within the lidar device emit light signals and the light detectors listen for reflected light signals for a duration that corresponds to a relatively long range (e.g., between 300 m and 450 m). During the second cycle, however, only subsets of the light emitters within the light device emit light signals (potentially sequentially) and the corresponding light detectors listen for reflected light signals for a duration that corresponds to a relatively short range (e.g., between 45 m and 75 m). By comparing the ranges represented by the detected light signals during the two cycles, signals corresponding to crosstalk can be identified and/or removed from a resulting dataset.

In a first aspect, a method is provided. The method includes emitting, from a first group of light emitters of a light detection and ranging (lidar) device, a first group of light signals into a surrounding environment. The first group of light signals corresponds to a first angular resolution with respect to the surrounding environment. The method also includes detecting, by a first group of light detectors of the lidar device during a first listening window, a first group of reflected light signals from the surrounding environment. The first group of reflected light signals corresponds to reflections of the first group of light signals from objects in the surrounding environment. Additionally, the method includes emitting, from a second group of light emitters of the lidar device, a second group of light signals into the surrounding environment. The second group of light emitters of the lidar device represents a subset of the first group of light emitters of the lidar device. The second group of light signals corresponds to a second angular resolution with respect to the surrounding environment. The second angular resolution is lower than the first angular resolution. Further, the method includes detecting, by a second group of light detectors of the lidar device during a second listening window, a second group of reflected light signals from the surrounding environment. The second group of light detectors of the lidar device represents a subset of the first group of light detectors of the lidar device. The second group of reflected light signals corresponds to reflections of the second group of light signals from objects in the surrounding environment. A duration of the second listening window is shorter than a duration of the first listening window. In addition, the method includes synthesizing, by a controller of the lidar device, a dataset usable to generate one or more point clouds. The dataset is based on the detected first group of reflected light signals and the detected second group of reflected light signals.

In a second aspect, a light detection and ranging (lidar) device is provided. The lidar device includes a first group of light emitters configured to emit a first group of light signals into a surrounding environment. The first group of light signals corresponds to a first angular resolution with respect to the surrounding environment. The lidar device also includes a first group of light detectors configured to detect, during a first listening window, a first group of reflected light signals from the surrounding environment. The first group of reflected light signals corresponds to reflections of the first group of light signals from objects in the surrounding environment. Additionally, the lidar device includes a second group of light emitters configured to emit a second group of light signals into the surrounding environment. The second group of light emitters of the lidar device represents a subset of the first group of light emitters of the lidar device. The second group of light signals corresponds to a second angular resolution with respect to the surrounding environment. The second angular resolution is lower than the first angular resolution. Further, the lidar device includes a second group of light detectors configured to detect, during a second listening window, a second group of reflected light signals from the surrounding environment. The second group of light detectors of the lidar device represents a subset of the first group of light detectors of the lidar device. The second group of reflected light signals corresponds to reflections of the second group of light signals from objects in the surrounding environment. A duration of the second listening window is shorter than a duration of the first listening window. In addition, the lidar device includes a controller configured to synthesize a dataset usable to generate one or more point clouds. The dataset is based on the detected first group of reflected light signals and the detected second group of reflected light signals.

In a third aspect, a system is provided. The system includes a light detection and ranging (lidar) device. The lidar device includes a first group of light emitters configured to emit a first group of light signals into a surrounding environment. The first group of light signals corresponds to a first angular resolution with respect to the surrounding environment. The lidar device also includes a first group of light detectors configured to detect, during a first listening window, a first group of reflected light signals from the surrounding environment. The first group of reflected light signals corresponds to reflections of the first group of light signals from objects in the surrounding environment. Additionally, the lidar device includes a second group of light emitters configured to emit a second group of light signals into the surrounding environment. The second group of light emitters of the lidar device represents a subset of the first group of light emitters of the lidar device. The second group of light signals corresponds to a second angular resolution with respect to the surrounding environment. The second angular resolution is lower than the first angular resolution. Further, the lidar device includes a second group of light detectors configured to detect, during a second listening window, a second group of reflected light signals from the surrounding environment. The second group of light detectors of the lidar device represents a subset of the first group of light detectors of the lidar device. The second group of reflected light signals corresponds to reflections of the second group of light signals from objects in the surrounding environment. A duration of the second listening window is shorter than a duration of the first listening window. In addition, the lidar device includes a lidar controller configured to synthesize a dataset usable to generate one or more point clouds. The dataset is based on the detected first group of reflected light signals and the detected second group of reflected light signals. The system also includes a system controller. The system controller is configured to receive the dataset from the lidar controller. The system controller is also configured to generate the one or more point clouds based on the dataset.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 6C is an illustration of a firing sequence used during a first cycle, according to example embodiments.

FIG. 6D is an illustration of a firing sequence used during a second cycle, according to example embodiments.

DETAILED DESCRIPTION

Figure 1:
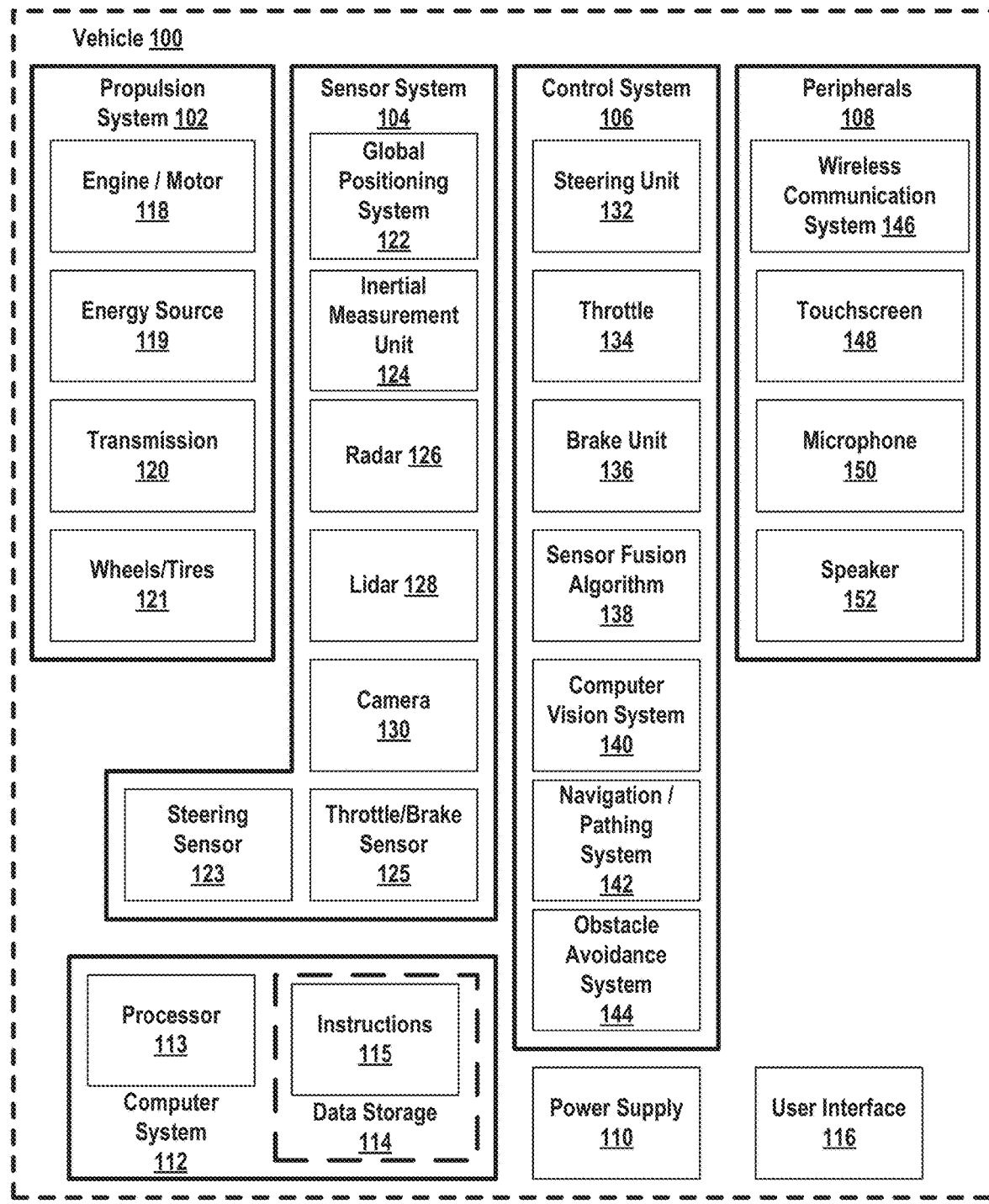
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, terrain, etc. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle.

Further, the light emitters could include optical fiber amplifiers, laser diodes, light-emitting diodes (LEDs), among other possibilities.

The term "subset" is used throughout this disclosure to describe groups of channels, light detectors, light emitters, etc. within various devices and systems (e.g., lidar devices). As used herein, the term "subset" represents a "proper subset" or "strict subset" in mathematical terms. Further, the term "subset," as used herein, excludes the empty set. In other words, for the purposes of this disclosure, if a set contains n elements, a "subset" of that set may contain any integer number of elements from 1 element up to n−1 elements, inclusive.

A lidar device can determine distances to reflective environmental features while scanning a scene. Those distances can then be assembled into a "point cloud" (or other type of representation) indicative of surfaces in the surrounding environment. Individual points in the point cloud can be determined, for example, by transmitting a laser pulse and detecting a returning pulse, if any, reflected from an object in the surrounding environment, and then determining a distance to the object according to a time delay between the transmission of the pulse and the reception of the reflected pulse. The resulting point cloud, for example, may correspond to a three-dimensional map of points indicative of locations of reflective features in the surrounding environment.

In example embodiments, lidar devices may include one or more light emitters (e.g., laser diodes) and one or more light detectors (e.g., silicon photomultipliers (SiPMs), single-photon avalanche diodes (SPADs), and/or avalanche photodiodes (APDs)). For example, a lidar device may include an array of channels, which includes light detectors and corresponding light emitters. Such arrays may illuminate objects in the scene and receive reflected light from objects in the scene so as to collect data that may be used to generate a point cloud for a particular angular field of view relative to the lidar device. Further, to generate a point cloud with an enhanced field of view (e.g., a complete 360° field of view), the array of light emitters and the corresponding array of light detectors may send and receive light at predetermined times and/or locations within that enhanced field of view. For example, the lidar device may include an array of channels arranged around the vertical axis such that light is transmitted and received in multiple directions around the 360° field of view simultaneously. As another example, a lidar device may scan (e.g., be rotated or use other mechanisms to beam scan) about a central axis to transmit/receive multiple sets of data. The data can be used to form point clouds that can be composited to generate the enhanced field of view.

Some lidar devices may be susceptible to noise resulting from high-intensity return signals. For example, if one light emitter emits a light pulse toward a highly reflective object (e.g., a retroreflector), the return pulse from that object may have a high intensity. In some cases, if the intensity of the return pulse is large enough, the return pulse may result in crosstalk between channels of the lidar device. In other words, in addition to being detected by the light detector corresponding to the light emitter that emitted the emission pulse, the high-intensity return pulse may be detected by other light detectors within the lidar device (e.g., light detectors adjacent to the light detector corresponding to the light emitter that emitted the emission pulse). Such crosstalk may be a result of and/or exacerbated by one or more defects within the optical path between the light detector and the object being detected. For example, an optical window of the lidar device may have rain, condensation, snow, dirt, mud, dust, ice, debris, etc. thereon. Such defects may reflect, refract, and/or disperse one or more reflected light signals from one or more objects in the surrounding environment, thereby resulting in crosstalk.

Crosstalk, regardless of the cause, can result in detection errors. For example, when a detector detects a return pulse that is the result of crosstalk, a computing device associated with the lidar device may improperly determine that an object is present at a location within the surrounding environment even though, in reality, no such object is present (i.e., the lidar device may generate false positive detections). Additionally or alternatively, as a result of detecting the high-intensity crosstalk return pulse, a proper return pulse (e.g., at a lower intensity) may be improperly overlooked. As such, example embodiments disclosed herein may serve to mitigate and/or eliminate improper detections arising from noise sources. While crosstalk resulting from highly reflective objects is referenced throughout this disclosure, it is understood that other sources of noise are also possible and could also be mitigated using the techniques described herein. For example, interference (e.g., originating from a spurious light source, such as from a different lidar device, or from a malicious light source, such as someone shining a laser pointer at the lidar device) on various light detectors might also be mitigated using one or more of the techniques described herein. Additionally or alternatively, electrical crosstalk could also be mitigated using the techniques described herein. Electrical crosstalk may include, for example, electrical signals coupling into adjacent or nearby light detectors when one light detector experiences a large detection signal.

In some embodiments, a lidar device is provided. As described above, the lidar device may include an array of channels. Each of the channels in the array may include a light detector and a corresponding light emitter. For example, the light emitter in a given channel may be configured to emit light pulses along a certain emission vector and the corresponding light detector may be configured to detect light pulses reflected from objects in the surrounding environment that are in the path of the emission vector. Each of the light detectors in different channels of the array of channels may be positioned near one another in the lidar device in an array of light detectors. As such, any high-intensity return pulses may influence light detectors that are nearby the primary light detector that detects the high-intensity return pulse.

One way to mitigate such crosstalk is to identify which channel in the array of channels has an emission vector that intersects the high-reflectivity object in the surrounding environment that causes the high-intensity return. Then, upon identifying the channel responsible that is the source of the crosstalk, the light emitter in that channel can simply refrain from emitting light pulses in future emission cycles. It may be difficult, however, to determine when (e.g., in which emission cycle) to once again resume emitting light pulses from the light emitter that corresponded to the high-intensity reflection. Likewise, another possible mitigation technique would be to simply disregard any detected pulses in future detection cycles that are detected by light detectors in the array that are nearby the primary light detector that detected the high-intensity reflection. This may result in a number of channels being essentially unused during one or more detection cycles, though. As is evident, the above mitigation strategies may result in multiple detected pulses being disregarded, perhaps unnecessarily.

As such, described herein are alternative noise mitigation techniques that can be used in conjunction with or instead of the previously described mitigation techniques. Namely, the techniques described herein may involve emitting/detecting light signals across two firing cycles. The first cycle may involve firing all of the channels of the lidar device and detecting all of the returns. This first cycle may seek to detect all possible returns, whether at relatively long range or relatively short range. The second cycle, however, may involve a series of staggered emissions/detections. The series of emissions/detections may be performed by subsets of channels within the lidar device (e.g., subsets that are far enough away from one another physically so as to not likely be susceptible to crosstalk from one another). Further, the emissions/detections in the second cycle may correspond to emissions/detections at a shorter range than those in the first cycle. As such, techniques described herein may make use of the fact that crosstalk may be a more significant issue at shorter ranges (e.g., the detection events in the second cycle may be used to detect shorter range objects whereas the detection events in the first cycle may be used to detect longer range objects). Finally, the detection events from the second cycle may be combined with the detection events from the first cycle to form a single dataset. The techniques described herein may represent a methodology of performing time-division multiple access for the various channels of the lidar device (i.e., by separating detection events in time, crosstalk can be identified and disregarded).

A complete detection cycle may proceed in the following manner. First (i.e., during the first cycle), the light emitters in each of the channels in the lidar device may emit light signals. Thereafter, the corresponding light detectors in the lidar device may detect reflections from objects in the surrounding environment during a first detection window. The duration (i.e., length of time) of the first detection window may be relatively long (e.g., between 2.0 µs and 3.0 µs) so as to allow for detection of objects that are at relatively long ranges (e.g., up to a range of between 300 m and 450 m). The detection events during the first detection window from the light detectors may then be temporarily stored (e.g., within a memory, such as a volatile memory). For example, these detection events may be stored as complete waveforms (e.g., intensity waveforms from the corresponding light detectors) and/or as metadata (e.g., data corresponding to detection time, detected intensity, and/or detected polarization).

Thereafter (i.e., during the second cycle), subsets of the light emitters may be fired during shorter time segments. For example, if the lidar device has 16 channels (e.g., labeled as "Channel 0," "Channel 1," "Channel 2," . . . "Channel 15"), light emitters in preselected subsets of channels may be fired in sequence. For instance, the light emitter of Channel 0 may be fired by itself (i.e., without firing other light emitters) during a portion of the second cycle. During this portion of the second cycle, the light detector of Channel 0 may detect reflections from objects in the surrounding environment during a second detection window. The duration of the second detection window may be shorter than the duration of the first detection window. For example, the duration of the second detection window may be between 0.3 µs and 0.5 µs so as to detect objects that are at relatively short ranges (e.g., up to a range of between 45 m and 75 m). The detection event(s) from this portion of the second cycle may then also be temporarily stored (e.g., within a memory, such as a volatile memory). As with the detection events during the first cycle, these detection events may be stored as complete waveforms (e.g., intensity waveforms from the corresponding light detectors) and/or as metadata (e.g., data corresponding to detection time, detected intensity, and/or detected polarization).

Next, the above portion of the second cycle performed for Channel 0 may be separately repeated for Channel 2, Channel 4, Channel 6, Channel 8, Channel 10, Channel 12, and Channel 14 during the second cycle. As is evident by the fact that not all of the channels are used (e.g., Channels 1, 3, 5, 7, 9, 11, 13, and 15 were not used in the previous example), the angular resolution of the channels selected during the second cycle may be less than the angular resolution of all the channels combined (e.g., the channels used during the first cycle). Because the ranges being probed during the second cycle may be shorter than during the first cycle, though, a lower angular resolution may be acceptable (e.g., if the surrounding environment is linearly over-resolved at shorter ranges such that it can be adequately linearly resolved at longer ranges). In other words, even with the reduction in angular resolution, the data captured during the second cycle may still provide sufficient linear resolution (e.g., in dots per inch) when considered at the shorter ranges involved during the second cycle (e.g., ranges less than 75 m). The amount of reduction in angular resolution may be based, at least in part, on a total duration allotted to the second cycle. For example, if there are 5 µs allotted for the second cycle, and each second detection window is 0.5 µs in duration, there may be 10 firing slots/portions available during the second cycle. As such, if channels are fired individually during the second cycle, the reduction in angular resolution may correspond to the total number of channels divided by the number of firing slots available (e.g., 16 total channels/10 firing slots, or an angular resolution reduction by a factor of 1.6).

It is understood that the arrangement of channels fired during the second cycle described above is provided as an example, and that other arrangements are also possible and are contemplated herein. Further, while light emitters of only a single channel may be fired during each portion of the second cycle, as described above, other numbers of channels may be used during portions of the second cycle (e.g., pairs of channels, groups of three channels, groups of four channels, and/or groups of five channels). For example, pairs of channels may be selected for simultaneous emission/detection in consecutive portions of the second cycle. In such embodiments, the pairs of channels selected during each of the portions of the second cycle may be selected such that channels being used (e.g., the detectors in the channels being used) are physically far enough away from one another to prevent crosstalk from occurring between the channels for each of the portions of the second cycle. The consecutive pairs of channels used across multiple portions of the second cycle may also represent an interlacing across the lidar device/the surrounding environment, in some embodiments. Still further, in some embodiments, the number of channels fired during one portion of the second cycle (e.g., a pair of channels) may be different than the number of channels fired during another portion of the second cycle (e.g., a group of three channels). Even further, while the first cycle described above is the longer-range, increased angular resolution cycle and the second cycle described above is the shorter-range, decreased angular resolution cycle, it is understood that the order of these cycles could be reversed (i.e., the first cycle is performed after the second cycle in time).

Additionally or alternatively, in some embodiments, prior detection data may be incorporated into the firing scheme. For example, in some embodiments, a high-reflectivity surface (e.g., a retroreflector) in the surrounding environment may have been identified during a prior firing cycle (e.g., based on a high-intensity reflection detected by one or more of the light detectors of the lidar device). Additionally, the channel (e.g., the light emitter of the channel) that is aimed at the identified high-reflectivity surface may also be identified. Then, in a subsequent firing cycle (e.g., during both the first cycle and the second cycle described above), the light emitter of the channel that is directed at the retroreflector may refrain from firing altogether. This can provide further robustness against incidental crosstalk.

Once all the detection events from the first cycle and the second cycle have been collected, those detection events may be synthesized to form a dataset that is usable to generate one or more point clouds. For example, the data from the first cycle may be provided (e.g., to a computing device by a controller of the lidar device) as a set of data usable to generate a first point cloud and the data from the second cycle may be provided (e.g., to a computing device by a controller of the lidar device) as a set of data usable to generate a second point cloud. Alternatively, in some embodiments, the detection events from the two cycles may be combined in such a way so that the resulting dataset is usable to generate a single point cloud. In such embodiments, the detection events corresponding to a given channel during the first cycle and the second cycle may be compared. For example, the distance to an object in the surrounding environment determined for a given channel (e.g., Channel 1) during the first cycle may be compared to the distance to an object in the surrounding environment determined for the same channel (e.g., Channel 1) during the second cycle. If the two distances are the same (or within some threshold difference value), it may be determined that the measurements were proper and does not represent crosstalk. Hence, one or both of the measured distances may be included in a dataset usable to generate a single point cloud. Further, if the measurement during the second cycle did not result in a measured distance, but the measurement during the first cycle did result in a measured distance, and the measurement during the first cycle was at a range beyond the range being measured during the second cycle, the distance measured during the first cycle may likewise be included in a dataset usable to generate a single point cloud (e.g., since that measurement can be determined as not corresponding to crosstalk). However, if the detection events detected during the second cycle and during the first cycle do not agree (e.g., are not within a threshold difference) and both correspond to a target range that is within the range being measured during the second cycle, the determined distances may not be included within the dataset (e.g., as the measurement during the first cycle may be the result of crosstalk) or only the distance measured during the second cycle may be included in the dataset.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and/or tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, robot devices, etc. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and/or emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) have defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and/or brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and/or a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve, a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, and/or one or more machine-learned models) operable to process and analyze images in an effort to determine objects that are in motion (e.g., other vehicles, pedestrians, bicyclists, and/or animals) and objects that are not in motion (e.g., traffic lights, roadway boundaries, speedbumps, and/or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and/or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle, a semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and/or robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones, sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; one or more lidars, cameras, and radars).

Note that the number, location, and type of sensor systems (e.g., 202, 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, and/or to reduce cost, to adapt to specialized environmental or application circumstances). For example, the sensor systems (e.g., 202, 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones, and/or sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and/or intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208, 210), to actively scan the environment near the back of the vehicle 200 for the presence of radio-reflective objects. Similarly, one or more radars can be located near the front of the vehicle 200 (e.g., sensor systems 212, 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, and/or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, and/or alarms) upon which control strategy for vehicle 200 may be based. For example, if the acoustic sensor detects a siren (e.g., an ambulatory siren, and/or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
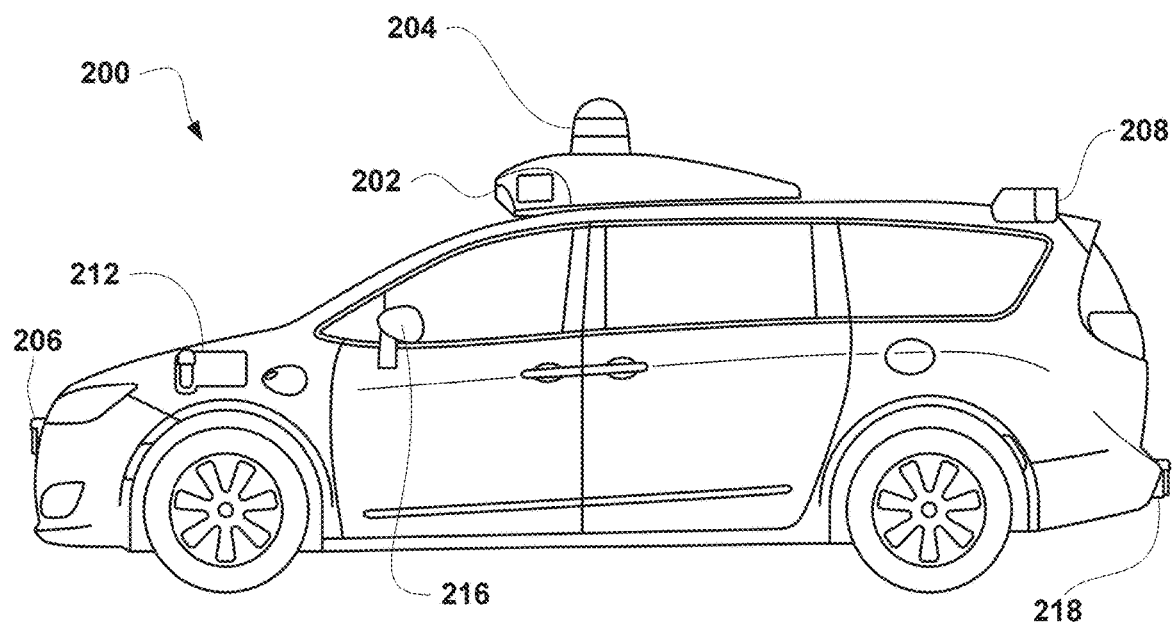
FIG. 2A is an illustration of a physical configuration of a vehicle, according to example embodiments.
Figure 2B:
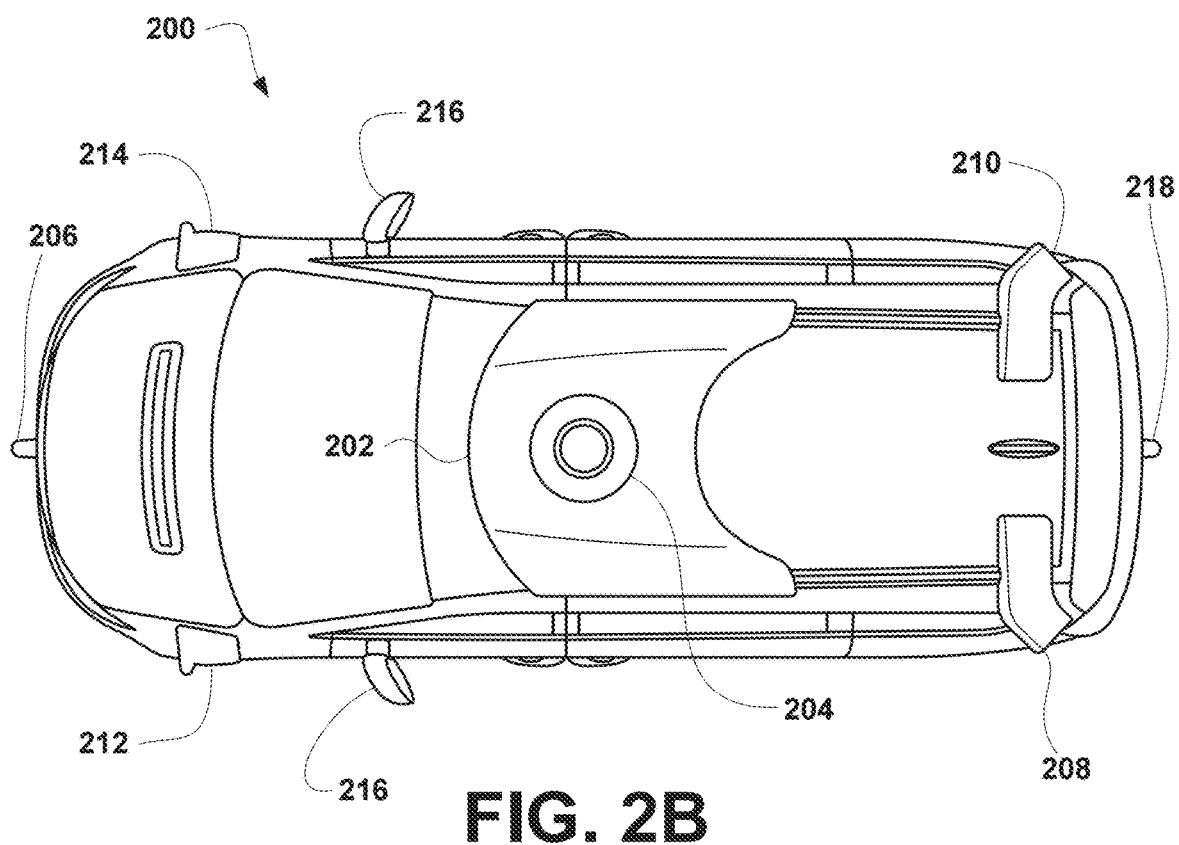
FIG. 2B is an illustration of a physical configuration of a vehicle, according to example embodiments.
Figure 2C:
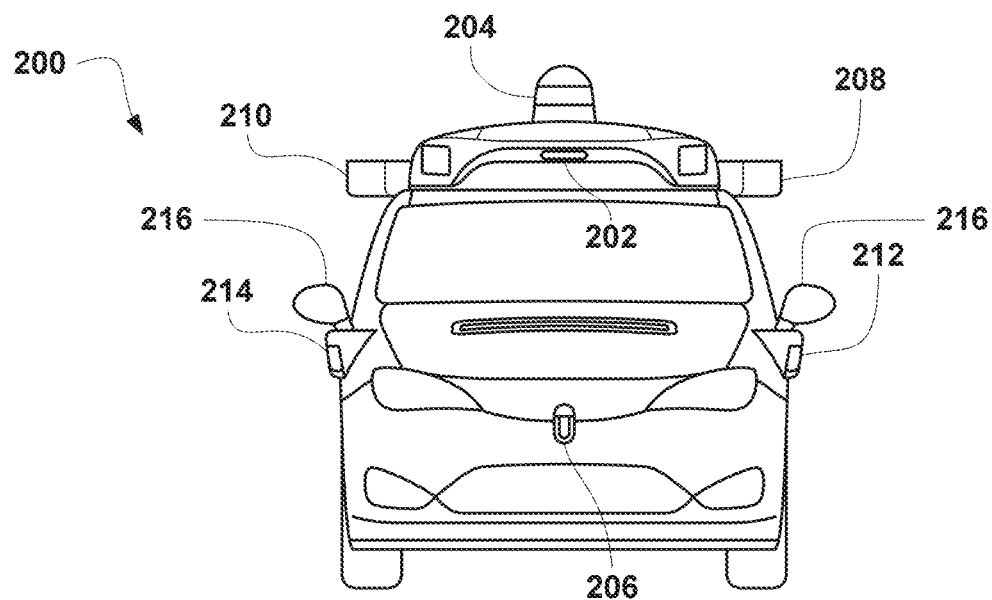
FIG. 2C is an illustration of a physical configuration of a vehicle, according to example embodiments.
Figure 2D:
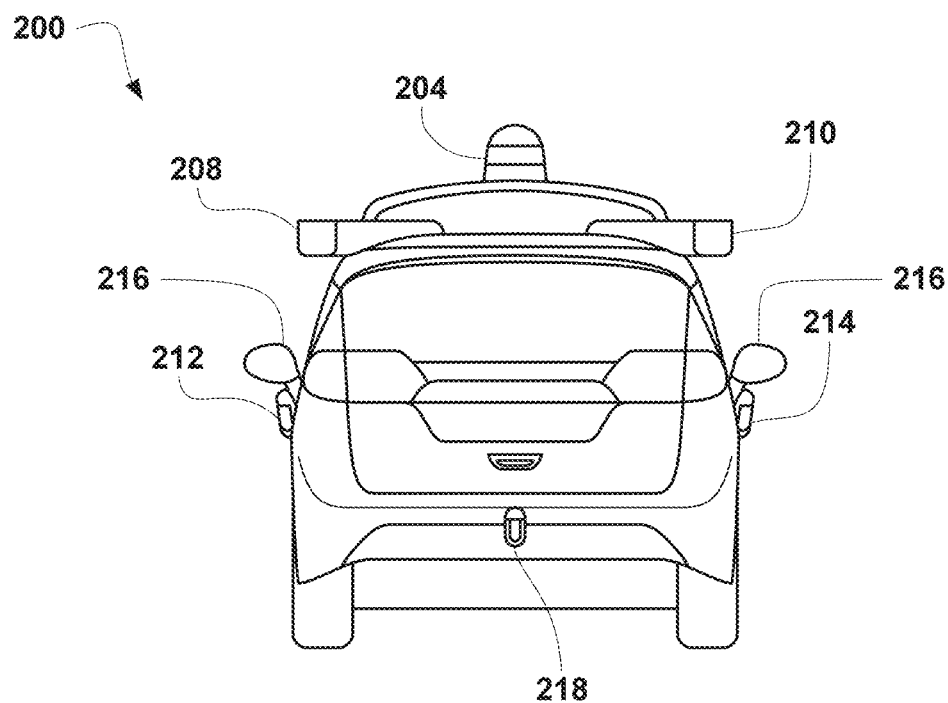
FIG. 2D is an illustration of a physical configuration of a vehicle, according to example embodiments.
Figure 2E:
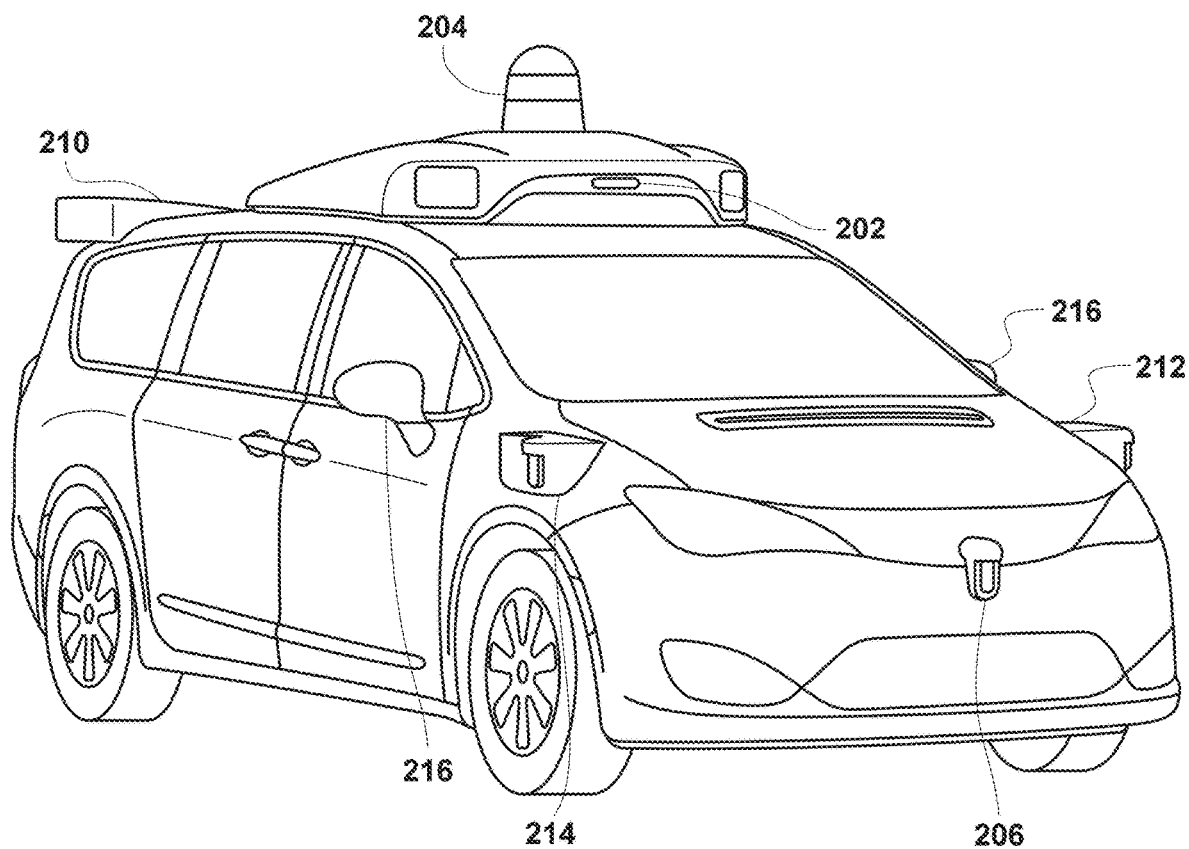
FIG. 2E is an illustration of a physical configuration of a vehicle, according to example embodiments.
Figure 2F:
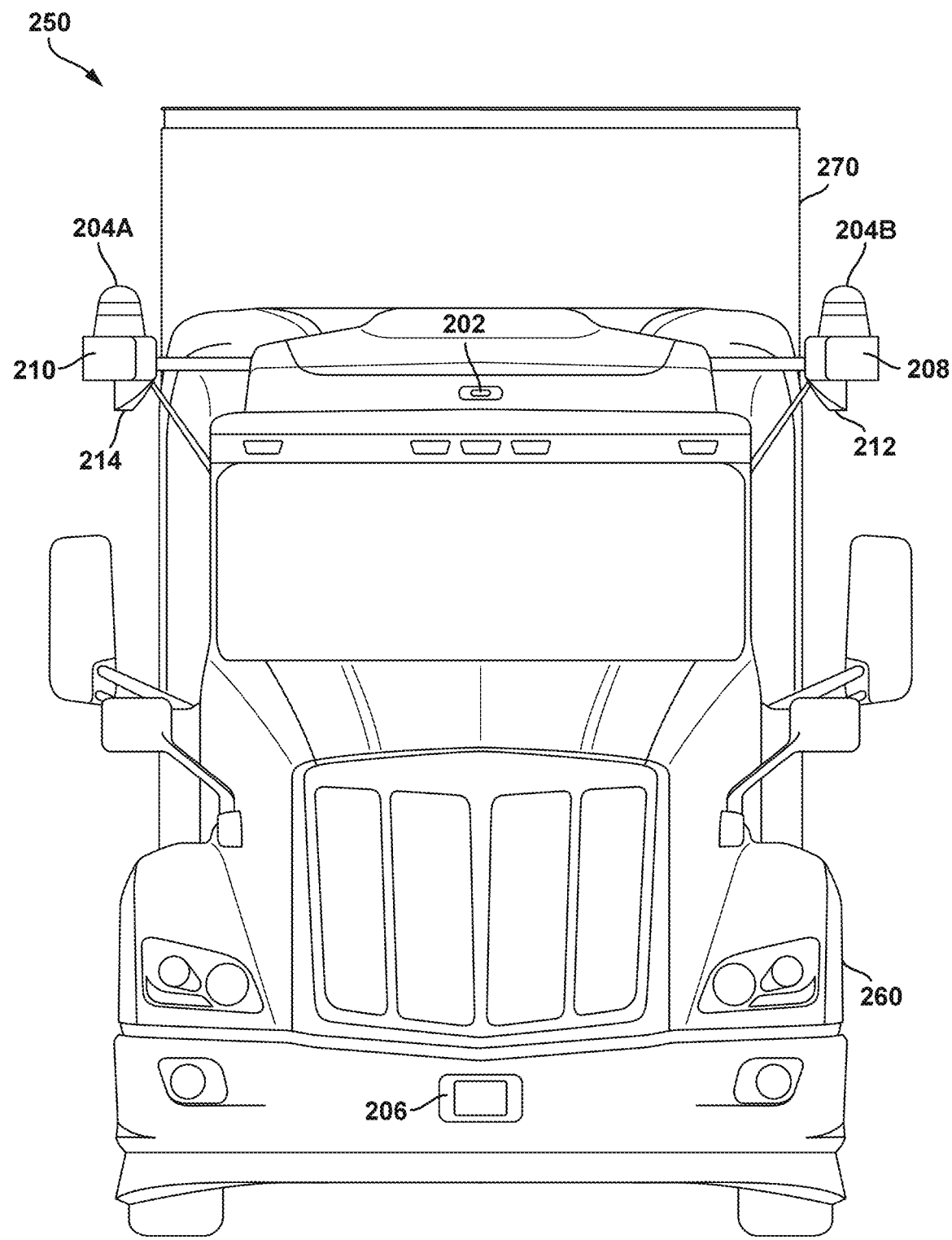
FIG. 2F is an illustration of a physical configuration of a vehicle, according to example embodiments.
Figure 2G:
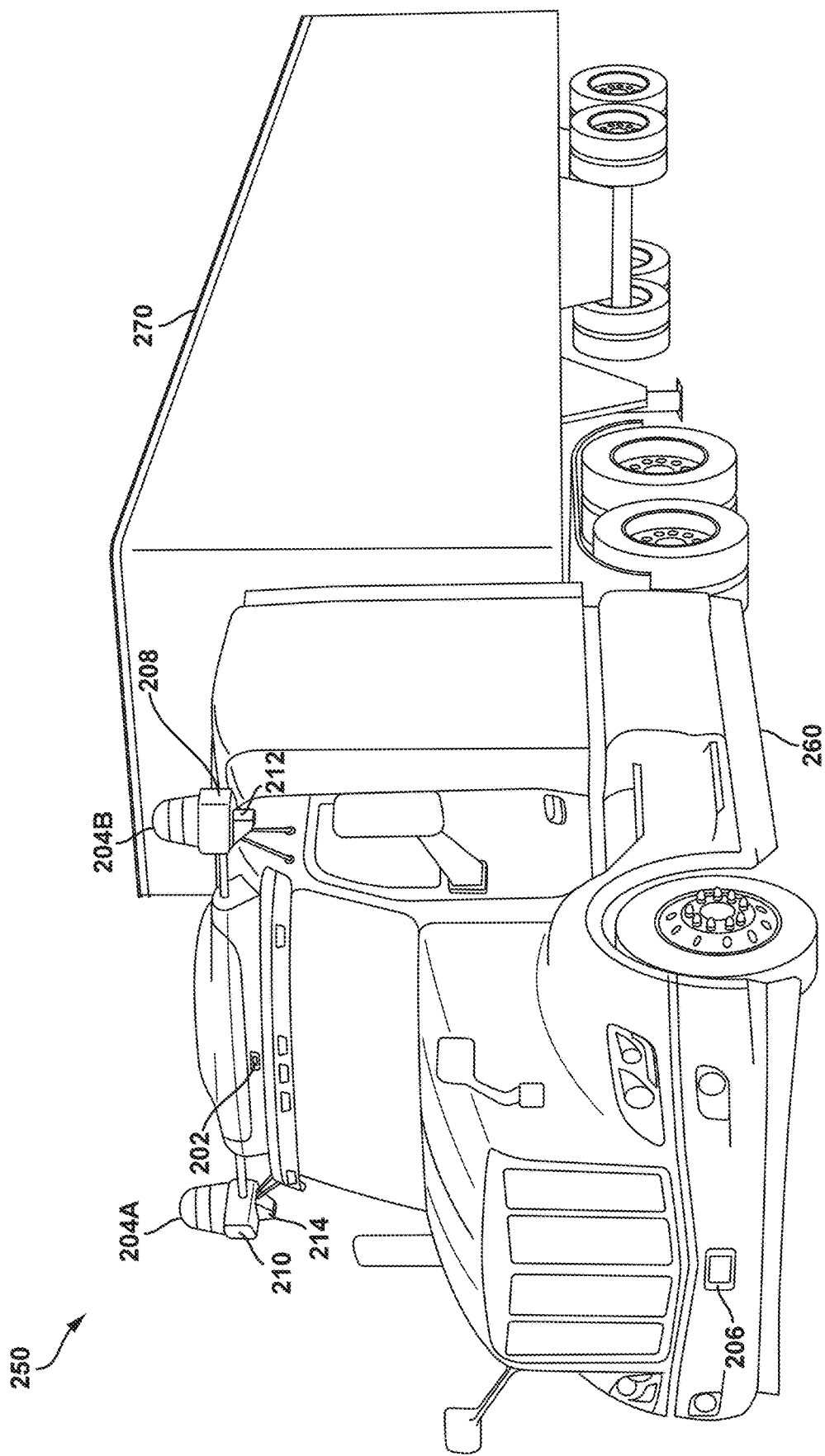
FIG. 2G is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G).

Figure 2H:
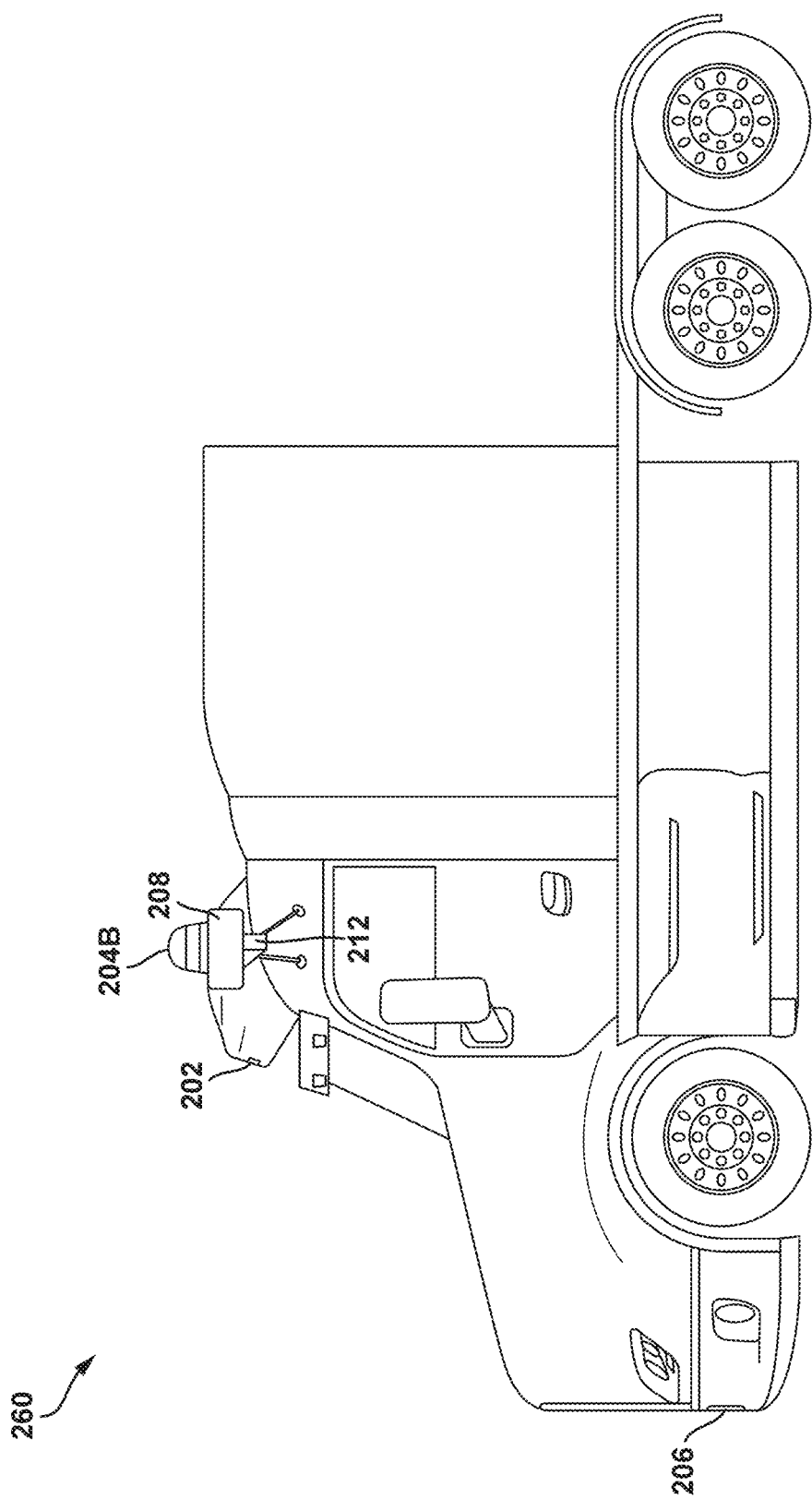
FIG. 2H is an illustration of a physical configuration of a vehicle, according to example embodiments.
Figure 2I:
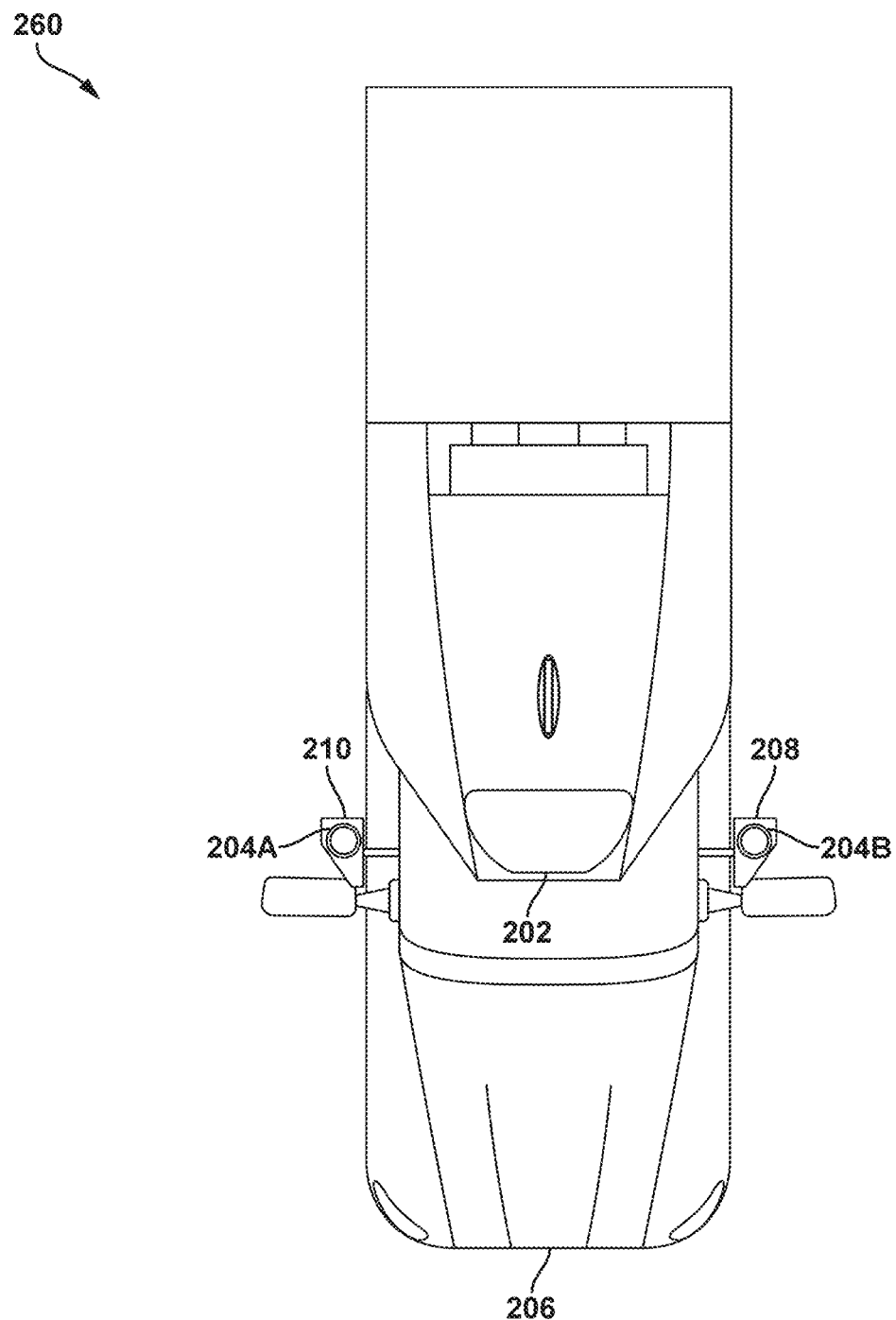
FIG. 2I is an illustration of a physical configuration of a vehicle, according to example embodiments.

FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
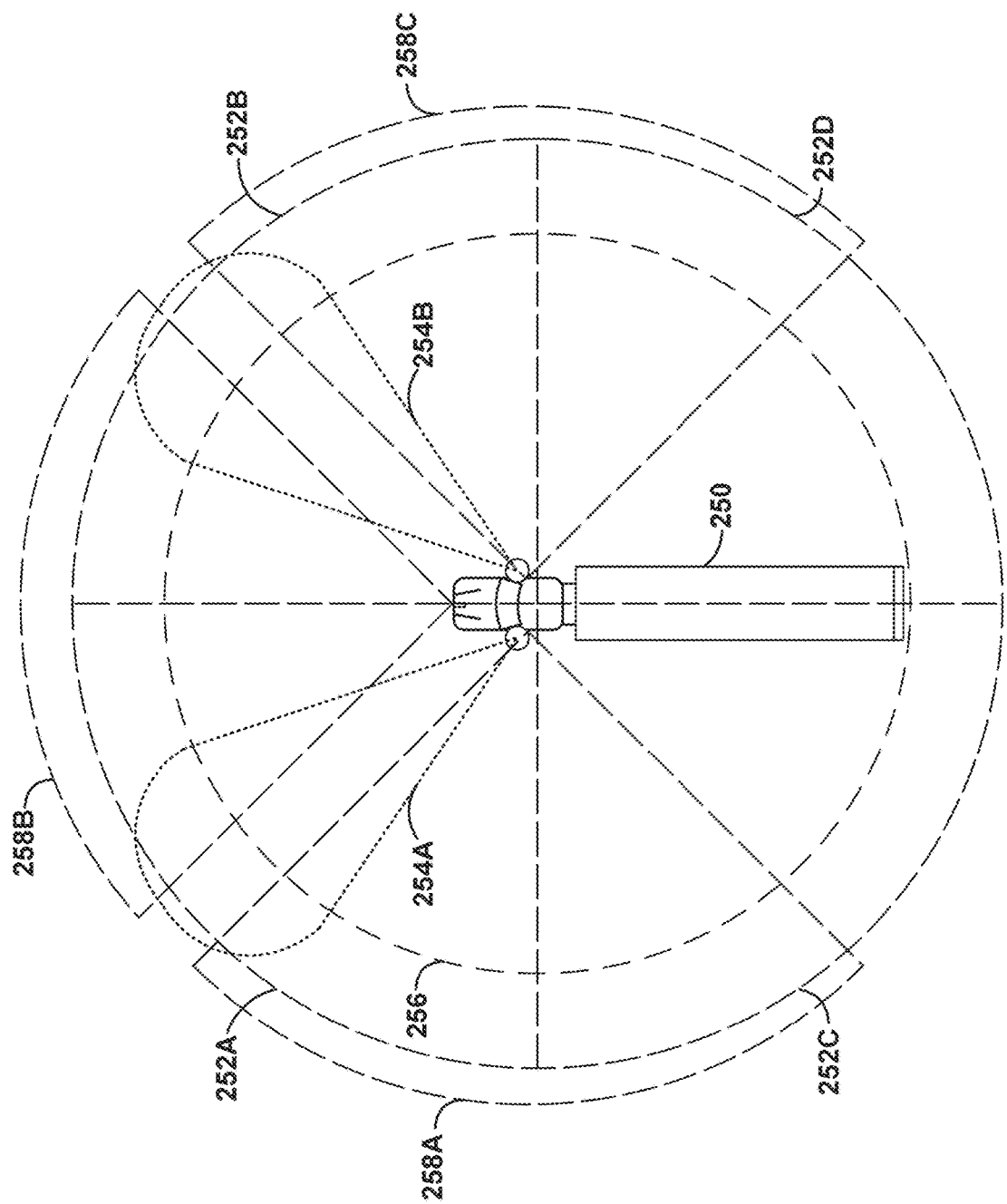
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
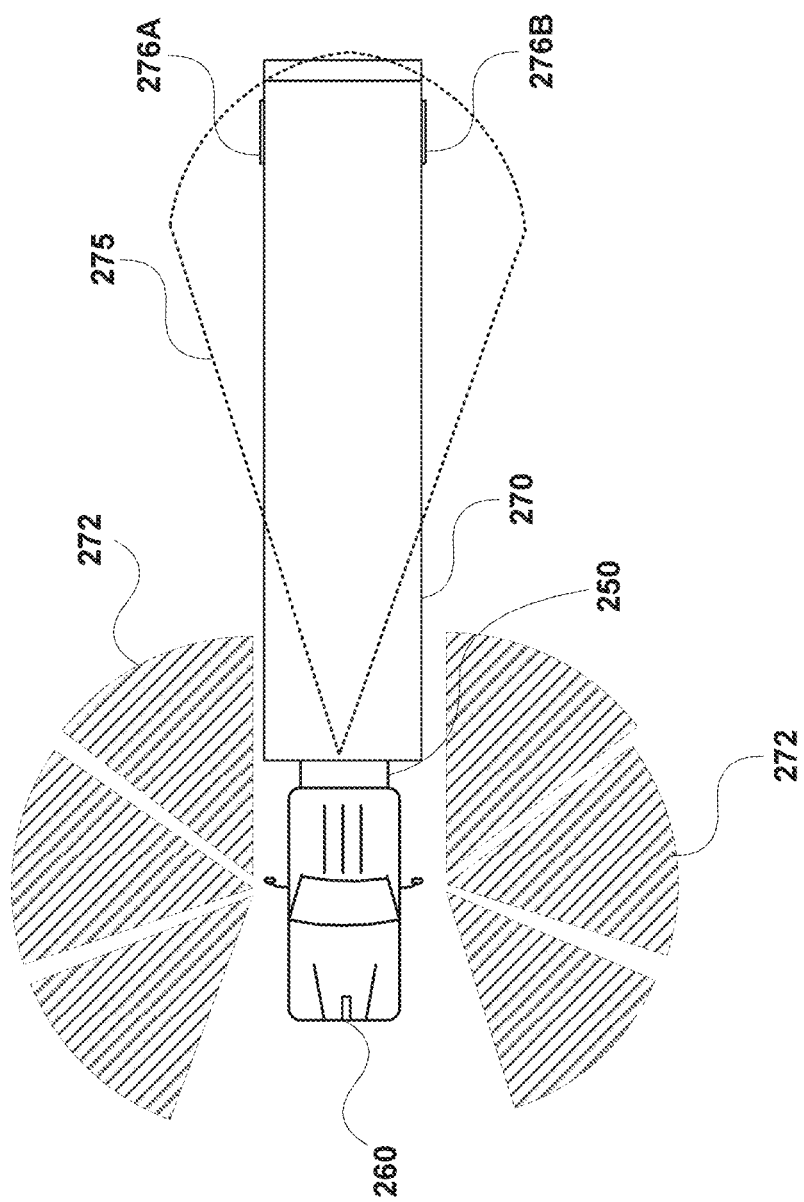
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
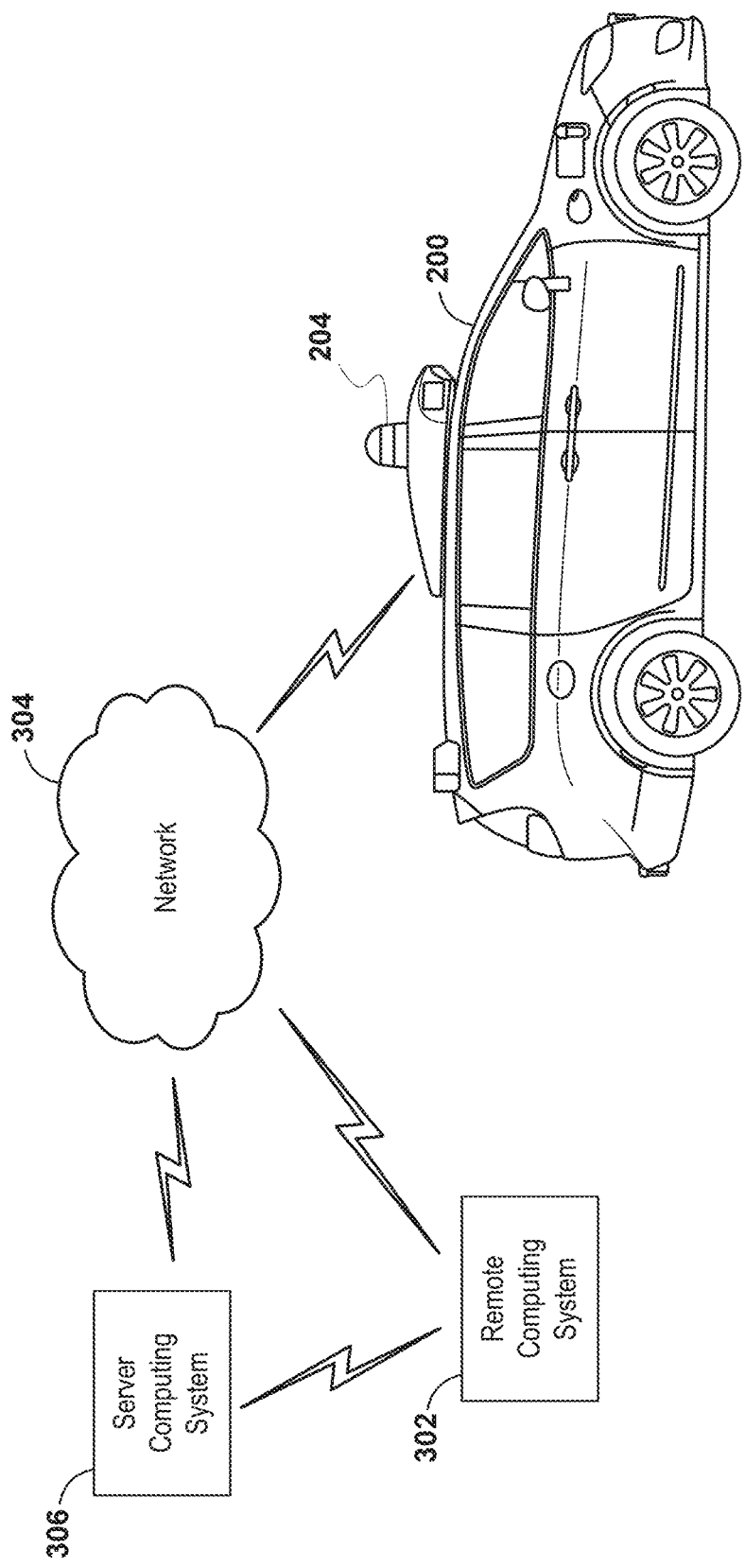
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, and/or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
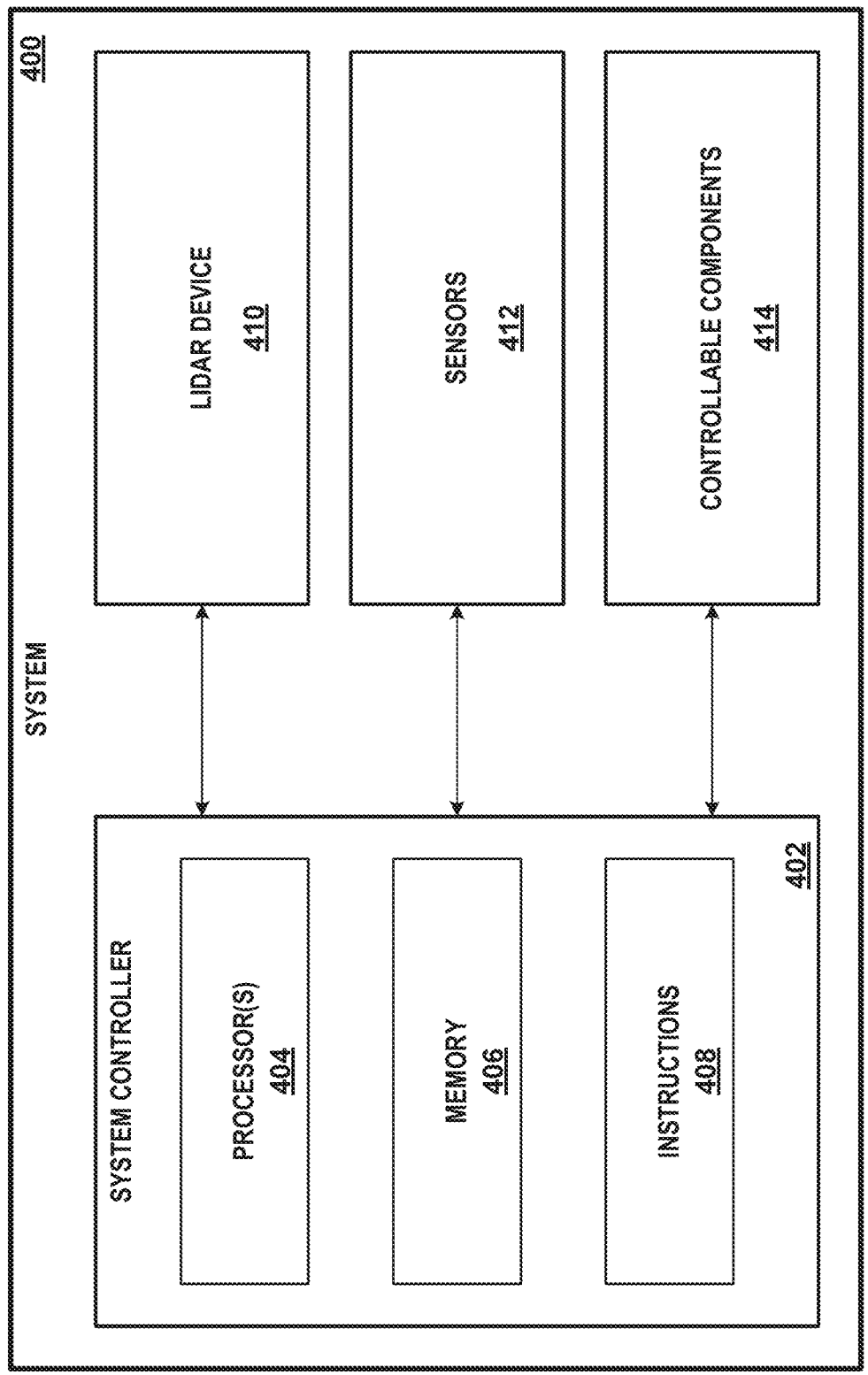
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and/or proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
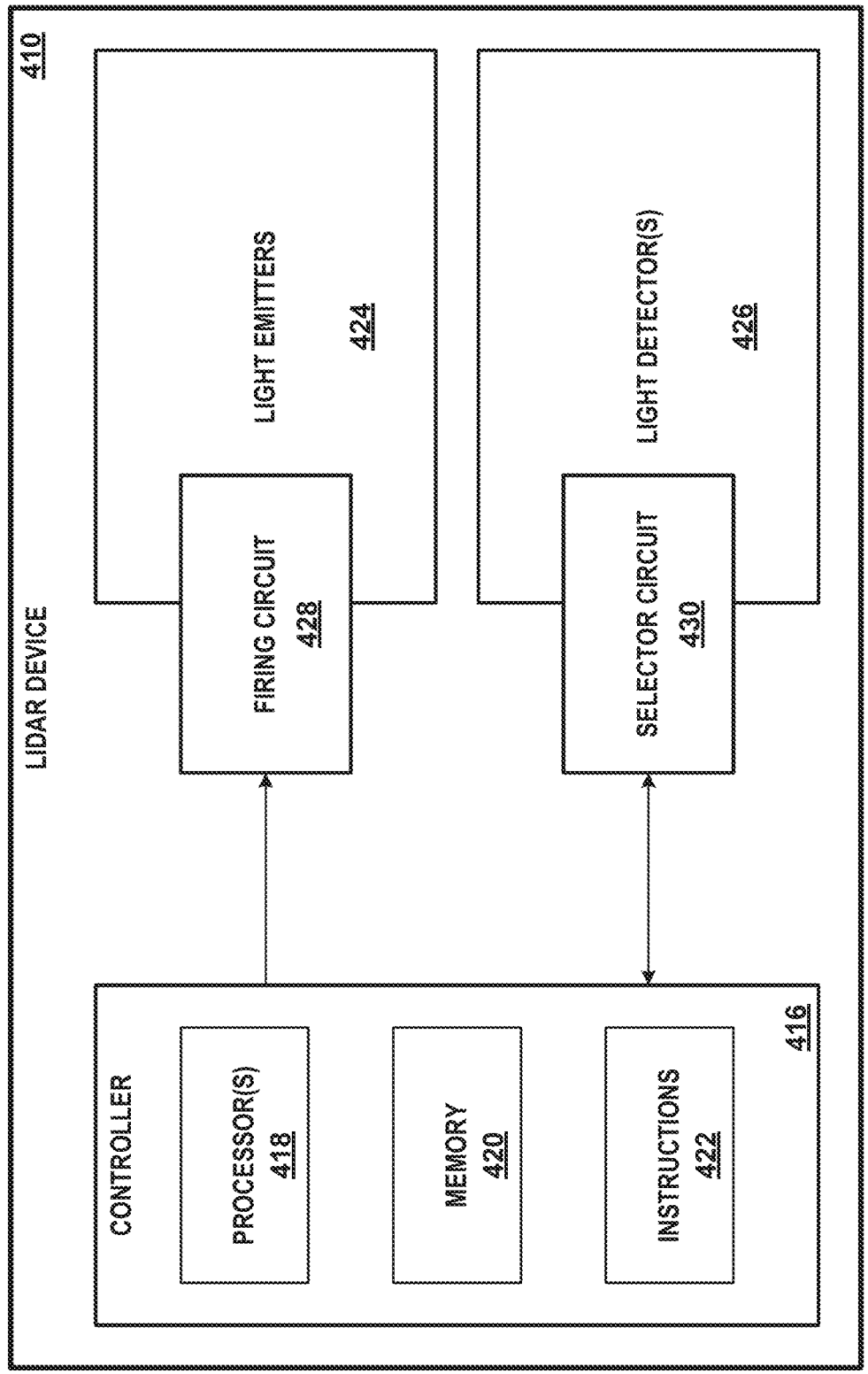
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, construction cones, etc. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

Figure 5A:
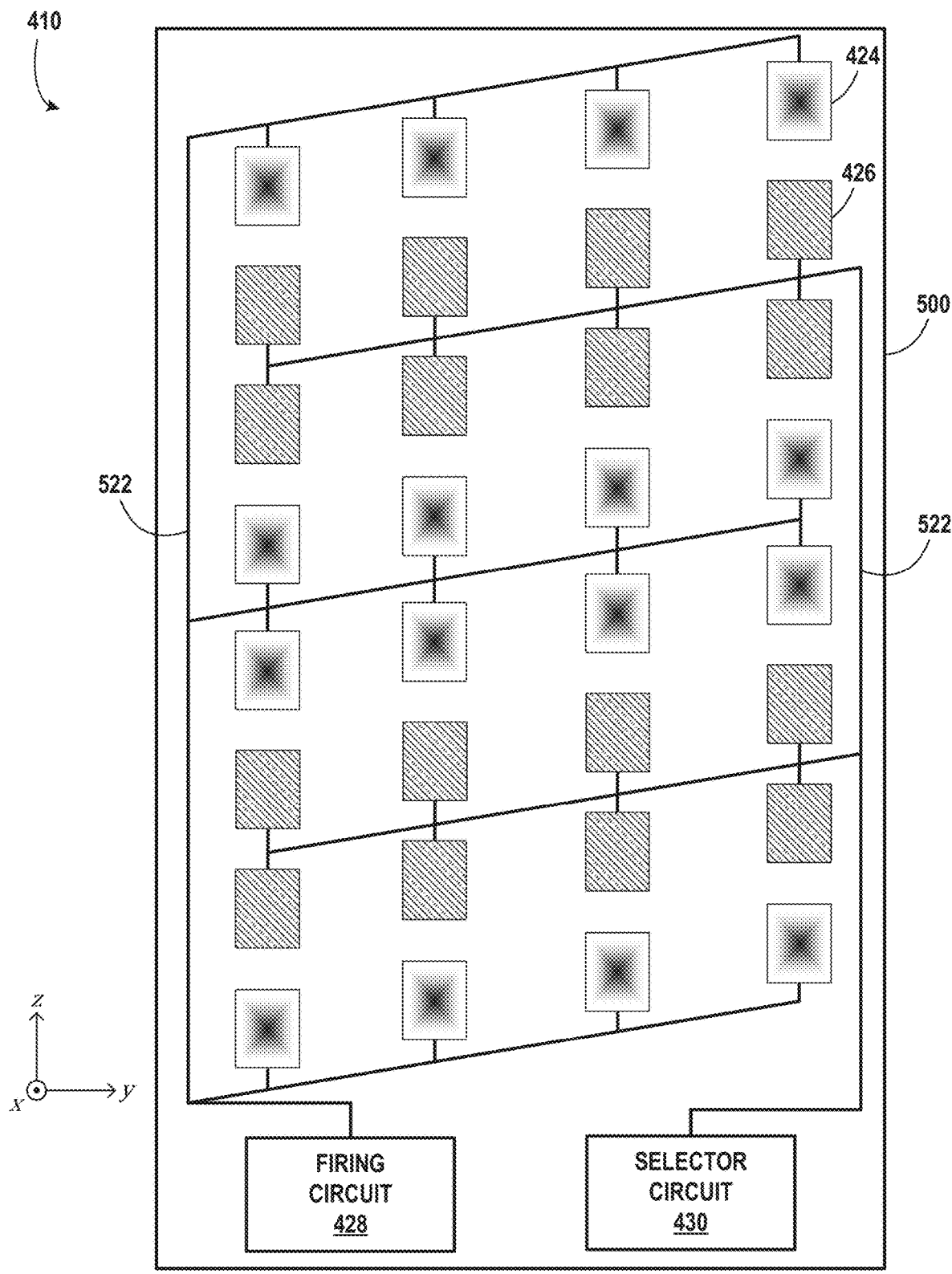
FIG. 5A is an illustration of a lidar device usable to emit a group of light signals and detect a group of reflected light signals, according to example embodiments.

FIG. 5A is an illustration of a lidar device usable to emit a group of light signals and detect a group of reflected light signals, according to example embodiments. For example, FIG. 5A may represent the physical arrangement of the light emitters 424 and the light detectors 426 within the lidar device 410 shown and described with reference to FIG. 4B. Such light emitters 424 and light detectors 426 may be positioned on (e.g., mounted to or fabricated on) a substrate 500, in some embodiments. Further, the light emitters 424 and light detectors 426 may be arranged into channels. Each channel may include a single light emitter 424 and a single corresponding light detector 426. For example, as illustrated in FIG. 5A, a light detector 426 may be positioned immediately adjacent to (e.g., above or below along the z-direction, as illustrated) its corresponding light emitter 424 on the substrate 500. It is understood, however, that other embodiments are also possible and contemplated herein. For example, multiple light detectors may correspond to a single light emitter, multiple light emitters may correspond to a single light detector, and/or light detectors may not be positioned adjacent to their corresponding light emitters.

Further, as illustrated in FIG. 5A, the light emitters 424 and light detectors 426 may be connected (e.g., electrically) to the firing circuit 428 and the selector circuit 430, respectively (e.g., similar to FIG. 4B). Such connections may occur using conductive traces 522, for example. It is understood, however, that the techniques described herein remain broadly applicable and that the arrangement of FIG. 5A, including the incorporation of the firing circuit 428 and the selector circuit 430, is provided solely as an example.

The light emitters 424 in the array may include light sources such as laser diodes. In some embodiments, the light emitters 424 may include pulsed light sources. For example, the light sources may include one or more pulsed lasers (e.g., a Q-switched laser). In alternate embodiments, a continuous wave (CW) light source may be used. In some embodiments, the light emitters 424 may include a fiber laser coupled to an optical amplifier. In particular, the fiber laser may be a laser in which an active gain medium (i.e., source of optical gain within the laser) is in an optical fiber. Moreover, the fiber laser could be arranged in various ways within lidar device 410 (e.g., partially disposed on the substrate 500 or entirely disposed on the substrate 500). In still other embodiments, however, one or more light emitters 424 in the array may additionally or alternatively include LEDs, vertical cavity surface emitting lasers (VCSELs), organic light emitting diodes (OLEDs), polymer light emitting diodes (PLEDs), light emitting polymers (LEPs), liquid crystal displays (LCDs), MEMS, and/or any other device configured to selectively transmit, reflect, and/or emit light to provide emitted light beams and/or pulses. The light emitters 424 may be configured to emit light signals toward objects in a surrounding environment that, when reflected by such objects, can be detected by the light detectors 426 to determine a distance between the lidar device 410 and the respective object.

The wavelength range emitted by the light emitters 424 could, for example, be in the ultraviolet, visible, and/or infrared portions of the electromagnetic spectrum. In some examples, the wavelength range can be a narrow wavelength range, such as is provided by lasers. In some embodiments, the wavelength range includes wavelengths that are approximately 905 nm. It is noted that this wavelength is provided only as an example and is not meant to be limiting.

Though not illustrated in FIG. 5A, it is understood that light signals (e.g., light pulses) emitted by the light emitters 424 in the array may be transmitted into the surrounding environment via one or more lenses, mirrors, chromatic filters, polarizers, waveguides, apertures, etc. For example, in some embodiments, light signals from the light emitters 424 may be redirected, focused, collimated, filtered, and/or otherwise adjusted prior to being transmitted to the surrounding environment. In some embodiments, the light emitters 424 may transmit light signals into the surrounding environment using shared optics (e.g., a single lens shared among all of the light emitters 424 or a group of the light emitters 424) and/or using optics that only correspond to a single light emitter 424 (e.g., a polarizer or chromatic filter only used by that light emitter 424).

In some embodiments, for example, each of the light emitters 424 may transmit light signals to different regions of the surrounding environment to observe a field of view in the surrounding environment. The location within the surrounding environment at which a given light emitter 424 may be transmitting a light signal may depend on the position of the light emitter 424 (e.g., the (y, z) position of the light emitter 424 on the substrate 500); the angular orientation of the light emitter 424 relative to the surface of the substrate 500, if any; and/or the positions/orientations of the optics (e.g., mirrors and/or lenses) by which the light emitter 424 is providing the light signal to the surrounding environment. In just one example, the light emitters 424 on the substrate 500 may emit light signals into the surrounding environment across a range of azimuthal angles and/or elevation angles (e.g., to interrogate a corresponding range of angles within the surrounding environment) based on the positions of the light emitters 424 on the substrate 500 relative to a shared telecentric lens assembly used by each of the light emitters 424 to provide light to a surrounding environment. Because of the shape of the shared telecentric lens assembly, the light signals may be spread across a range of azimuthal angles and/or elevation angles.

The light detectors 426 may include various types of detectors (e.g., single-photon detectors). For example, the light detectors 426 may include SPADs and/or SiPMs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In some embodiments, the light detectors 426 may be biased above an avalanche breakdown voltage. Such a biasing condition may create a positive feedback loop having a loop gain that is greater than one. In addition, SPADs biased above the threshold avalanche breakdown voltage may be single-photon sensitive. In other examples, the light detectors 426 may include photoresistors, charge-coupled devices (CCDs), photovoltaic cells, and/or any other type of light detector.

In some implementations, the array of light detectors 426 may include more than one type of light detector across the array. For example, the array of light detectors 426 can be configured to detect multiple predefined wavelengths of light (e.g., in embodiments where the light emitters 424 emit different wavelengths of light across the array of light emitters 424). To that end, for example, the array of light detectors 426 may include some SPADs that are sensitive to one range of wavelengths and other SPADs that are sensitive to a different range of wavelengths. In some embodiments, the light detectors 426 may be sensitive to wavelengths between 400 nm and 1.6 µm (visible and/or infrared wavelengths). Further, the light detectors 426 may have various sizes and shapes. For example, the light detectors 426 may include SPADs that have package sizes that are 1%, 0.1%, or 0.01% of the total area of the substrate 500. Still further, in some embodiments, one or more of the light detectors 426 may include detector-specific optics. For example, each of the light detectors 426 may include a micro-lens positioned over the light detector 426 to enhance the amount of received light that is transmitted to a detection surface of the light detector 426. Additionally or alternatively, one or more of the light detectors 426 may include one or more optical filters (e.g., neutral-density filter(s), polarization filter(s), and/or chromatic filter(s)).

As described above, each of the light detectors 426 may correspond to a light emitter 424. In some embodiments, the light detectors 426 may receive light from the surrounding scene via one or more optics (e.g., chromatic filters, polarizers, lenses, mirrors, and/or waveguides). Such optics may be specific to one of the light detectors 426 and/or shared by groups of light detectors 426 (e.g., all the light detectors on the substrate 500). Even further, in some embodiments, one or more of the receive optics may be part of a transmit path for one or more of the light emitters 424, in addition to being a part of a receive path for one or more of the light detectors 426. For example, a mirror may reflect light from one or more of the light emitters 424 into a surrounding environment and may also direct light received from the surrounding environment to one or more of the light detectors 426.

As described above, the light emitters 424 may be configured to transmit light signals to a surrounding environment across a range of azimuthal and/or elevation angles (i.e., yaw angles and/or pitch angles). Similarly, based on the positions of the light detectors 426 in the lidar device 410, the light detectors 426 may be arranged to receive light signals reflected from objects in the environment surrounding the lidar device 410 across a corresponding range of azimuthal and/or elevation angles (i.e., yaw angles and/or pitch angles).

The array of light emitters 424 may be powered by and/or controlled by the firing circuit 428. Likewise, the light detectors 426 may be powered by, controlled by, and/or provide detection signals to the selector circuit 430. As illustrated in FIG. 5A, the firing circuit 428 may be connected to one or more of the light emitters 424 by conductive traces 522 defined in the substrate 500 and the selector circuit 430 may be connected to one or more of the light detectors 426 by conductive traces 522 defined in the substrate 500. FIG. 5A illustrates a first conductive trace 522 connecting the firing circuit 428 to the light emitters 424 and a second conductive trace 522 connecting the selector circuit 430 to the light detectors 426. It is understood that this is provided solely as an example. In other embodiments, the firing circuit 428 may be connected individually to each of the light emitters 424 by separate conductive traces 522. Likewise, the selector circuit 430 may be connected individually to each of the light detectors 426 by separate conductive traces 522. Alternatively, the firing circuit 428 may be connected to banks of light emitters 424 by a single conductive trace 522 and/or the selector circuit 430 may be connected to banks of light detectors 426 by a single conductive trace 522. For example, groups of four light emitters 424 may be connected to the firing circuit 428 by a single conductive trace 522. In this way, banks of four light emitters 424 could be fired simultaneously by the firing circuit 428. Other numbers of light emitters 424 or light detectors 426 within a group are also possible.

In some embodiments, the firing circuit 428 may include one or more capacitors. Such capacitors may be charged by one or more power supplies. Then, to cause the light emitters 424 to emit light signals (i.e., to "fire"), the stored energy in the capacitors may be discharged through the light emitters 424. In some embodiments, the firing circuit 428 may cause the light emitters 424 to emit light signals simultaneously with one another. In other embodiments, the firing circuit 428 may cause the light emitters 424 to emit light signals sequentially. Other firing patterns (including random and pseudo-random firing patterns) are also possible and contemplated herein.

Additionally, in some embodiments, the firing circuit 428 may be controlled by a controller (e.g., the controller 416 illustrated and described with reference to FIG. 4B). The controller 416 may selectively fire the light emitters 424 using the firing circuit 428 via firing-control signals (e.g., according to a predefined pattern). In some embodiments, the controller 416 may also be configured to control other functions of the lidar device 410. For example, the controller may control the movement of one or more movable stages associated with the lidar device 410 and/or generate a point-cloud representation of the environment surrounding the lidar device 410 based on received electronic signals from light detectors 426 in the lidar device 410 that correspond to detected light signals reflected from objects in the environment. Generating the point-cloud representation may be done based on the intensity of the detected signal compared to the intensity of an emitted signal and/or based on the timing of the detected signal compared to the timing of an emitted signal, in various embodiments. In alternate embodiments, data about detected light signals and/or emitted light signals (e.g., timing data or intensity data) may be transmitted to a separate computing device (e.g., a remotely located server computing device; or an on-board vehicle controller, such as system controller 402 illustrated and described with reference to FIG. 4A). The separate computing device may be configured to generate the point-cloud representation (e.g., and store the point-cloud representation in a memory, such as memory 406, and/or transmit the point-cloud representation to a lidar controller).

It is understood that the arrangement illustrated in FIG. 5A is provided as an example and that other embodiments are also possible and are contemplated herein. For example, a lidar device 410 may instead include multiple substrates 500, each having light emitters 424 and light detectors 426 thereon. Additionally or alternatively, in some embodiments, the number of light emitters 424 on the substrate 500 may be different than illustrated in FIG. 5A (e.g., greater or fewer than sixteen light emitters 424), the number of light detectors 426 on the substrate 500 may be different than illustrated in FIG. 5A (e.g., greater or fewer than sixteen light detectors 426), the arrangement of the light emitters 424 on the substrate 500 may be different than illustrated in FIG. 5A, the arrangement of the light detectors 426 on the substrate 500 may be different than illustrated in FIG. 5A, the position and/or number of conductive traces 522 may be different than illustrated in FIG. 5A, the relative size of one or more of the light emitters 424 may be different than illustrated in FIG. 5A, and/or the relative size of one or more of the light detectors 426 may be different than illustrated in FIG. 5A. Other differences are also possible and are contemplated herein.

Figure 5B:
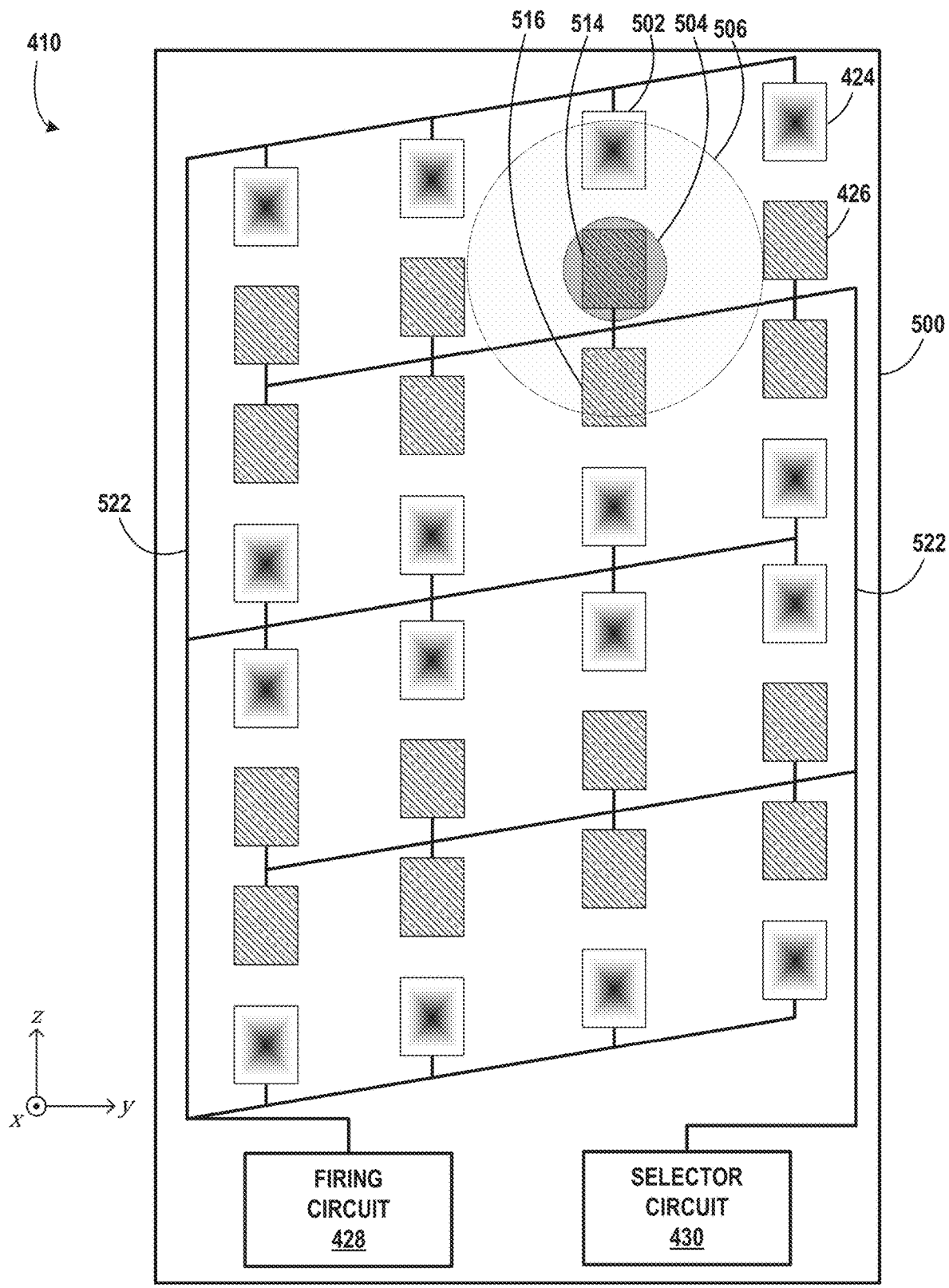
FIG. 5B is an illustration of potential crosstalk within a lidar device, according to example embodiments.

FIG. 5B is an illustration of potential crosstalk between channels within a lidar device (e.g., the lidar device 410 illustrated and described with reference to FIGS. 4A, 4B, and 5A), according to example embodiments. For example, the lidar device 410 may include the substrate 500, the array of channels (e.g., each channel including a light emitter 424 and a light detector 426, as illustrated in FIG. 5A), the firing circuit 428, the selector circuit 430, and the conductive traces 522.

As an example, the lidar device 410 may include a first light emitter 502. The first light emitter 502 may emit a light signal into a surrounding environment. Typically, upon the emitted light signal being reflected by a surface having a moderate reflectivity, a moderate-intensity reflected light signal 504 may be directed back to the lidar device. As illustrated in FIG. 5B, the moderate-intensity reflected light signal 504 may illuminate a corresponding first light detector 514 within the lidar device 410. Further, the size of the moderate-intensity reflected light signal 504 may not be large enough to substantially and/or measurably illuminate other light detectors 426 within the lidar device. However, if the light signal emitted from the first light emitter 502 into the surrounding environment is reflected by a surface having a high reflectivity (e.g., a retroreflector), the intensity of the reflected signal may be higher and/or occupy a larger detectable area when incident on the array of light detectors 426. As illustrated in FIG. 5B, a high-intensity reflected light signal 506 may illuminate multiple light detectors 426. For example, the high-intensity reflected light signal 506 may illuminate the first light detector 514 as well as one or more second light detectors 516. The second light detectors 516 may be referred to herein as light detectors susceptible to crosstalk (e.g., crosstalk from the reflected light signal resulting from the emission signal from the first light emitter 502) meaning that the second light detectors 516 may undesirably detect light from the first channel (e.g., which may result in noise or improper detection events based on the detections of the second light detectors 516).

It is understood that which of the light detectors 426 within the lidar device can detect a given reflected signal (e.g., which light detectors 426 are susceptible to crosstalk) may depend on the intensity of the reflected signal (e.g., based on the reflectivity of the surface in the surrounding environment), the sensitivity of the light detectors 426, the location of the light detectors 426 in the lidar device, the orientation of the light detectors 426 in the lidar device (e.g., the azimuthal/yaw angular orientation and/or elevation/pitch angular orientation of the light detectors 426), the distance to the reflective surface in the surrounding environment, etc. For example, in some embodiments, the farther the distance from the lidar device 410 to the reflective surface in the surrounding environment, the fewer the number of light detectors 426 that might be affected by crosstalk (e.g., the farther the distance to the reflective surface, the smaller the radius of the high-intensity reflected light signal 506). This may be a result of reflected light signals attenuating/diverging as they propagate through the surrounding environment (e.g., because of dust, smoke, etc. in the surrounding environment), resulting in a decrease in the intensity of a light signal the farther the separation between the lidar device and the reflective surface.

Given the above, it is understood that in various embodiments reflected signals may be detected by unintended light detectors 426 in the lidar device 410, thereby resulting in crosstalk. Embodiments described herein may attempt to mitigate crosstalk within a lidar device 410, regardless of the cause (e.g., regardless if the crosstalk was caused by a high-reflectivity surface and/or, if the crosstalk was caused by a high-reflectivity surface, regardless of the separation between the lidar device 410 and the high-reflectivity surface).

Figure 6A:
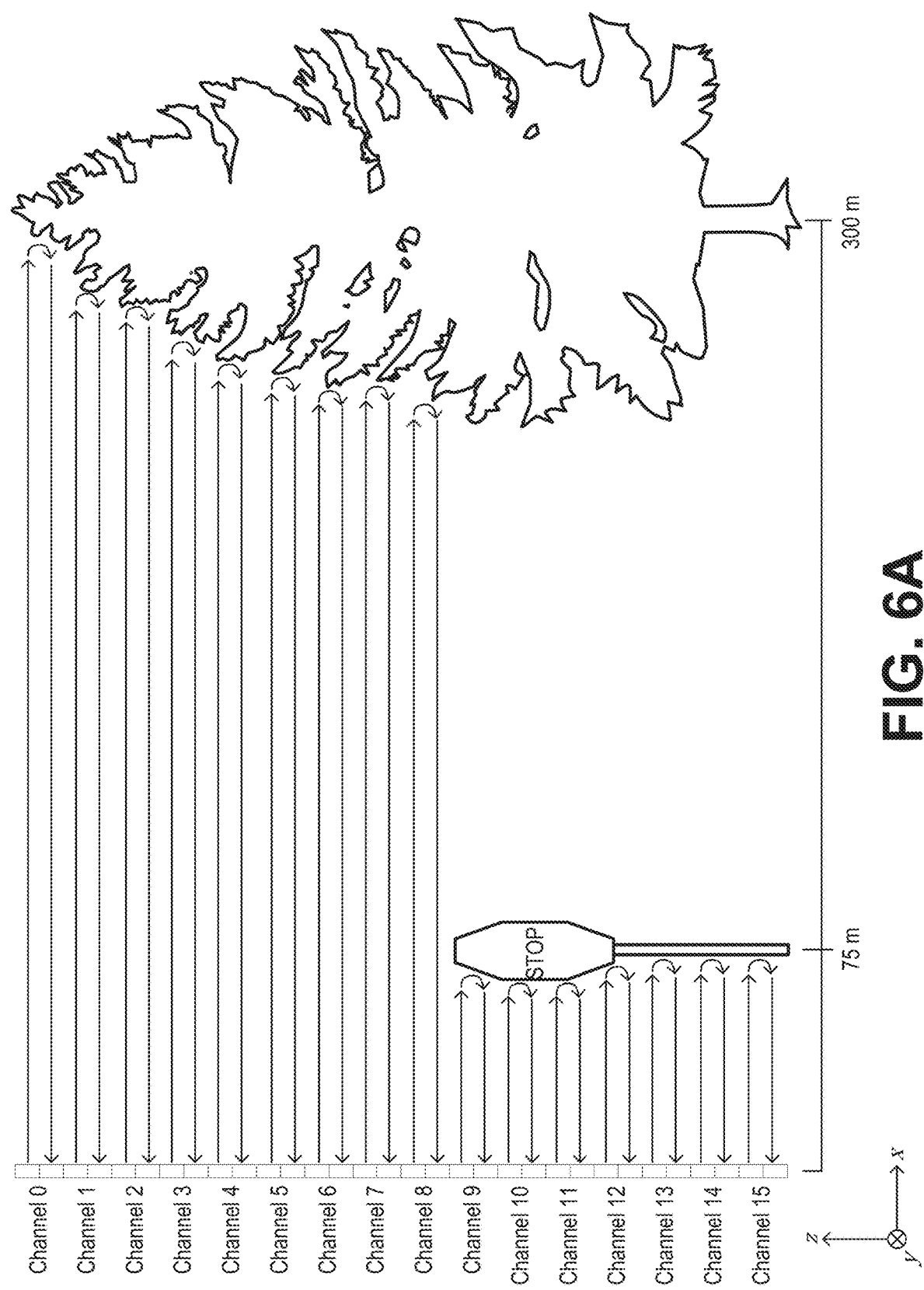
FIG. 6A is an illustration of a first group of emitted light signals and a first group of reflected light signals during a first cycle, according to example embodiments.
Figure 6B:
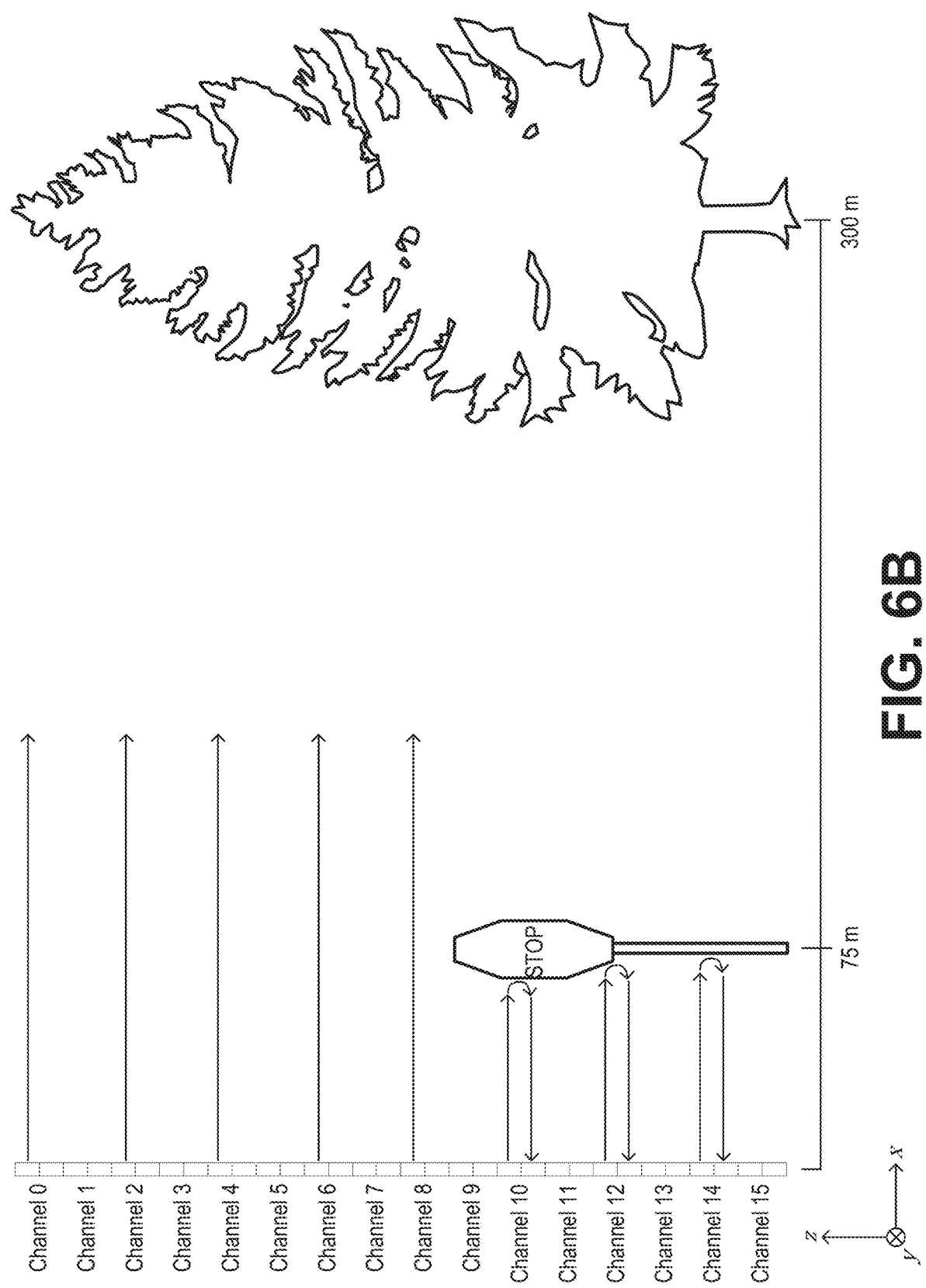
FIG. 6B is an illustration of a second group of emitted light signals and a second group of reflected light signals during a second cycle, according to example embodiments.

FIGS. 6A and 6B illustrate a technique according to example embodiments that may be used to mitigate crosstalk. The technique may include different channels of a lidar device (e.g., the lidar device 410 shown and described with respect to FIGS. 4B, 5A, and 5B) emitting light signals according to different emission patterns and/or firing sequences and then subsequently detecting the reflected light signals. FIG. 6A, for example, may illustrate the light signals emitted by light emitters 424 of the lidar device 410 and reflected light signals detected by the light detectors 426 of the lidar device 410 during a first cycle. As illustrated in FIG. 5A, the lidar device 410 may have 16 channels (e.g., numbered Channel 0, Channel 1, Channel 2, . . . , Channel 15), each including a light emitter 424 and corresponding light detector 426. During the first cycle, the light emitter 424 of each of the 16 channels may emit a light signal and, if the emitted light signal is reflected from an object in the surrounding environment, the corresponding light detector 426 may detect a reflected light signal. The light detectors 426 within the lidar device 410 may wait for a reflected light signal during a listening window of the first cycle. This listening window may be of sufficient duration to allow light signals reflected from distant objects (e.g., objects greater than 150 m away, greater than 200 m away, greater than 250 m away, greater than 300 m away, greater than 350 m away, greater than 400 m away, greater than 450 m away, or greater than 500 m away) to still be detected by the light detectors 426.

FIG. 6B, on the other hand, may illustrate the light signals emitted by light emitters 424 of the lidar device 410 and reflected light signals detected by the light detectors 426 of the lidar device 410 during a second cycle. As illustrated in FIG. 6B, only a subset of the channels may emit light (e.g., during sequential listening windows) during the second cycle. Such an emission strategy may prevent crosstalk from arising due to adjacent channels emitting/detecting simultaneously. For example, as illustrated, only light emitters 424 in even numbered channels (e.g., Channel 0, Channel 2, Channel 4) may emit light signals during the second cycle. Like with the first cycle, the light detectors 426 within the lidar device 410 may wait for a reflected light signal during a listening window of the second cycle. This second listening window, however, may only be of sufficient duration to allow light signals reflected from relatively close objects (e.g., objects less than 150 m away, less than 125 m away, less than 100 m away, less than 75 m away, or less than 50 m away) to be detected by the light detectors 426. Because the listening windows during the second cycle may be shorter in duration than the listening windows during the first cycle, the overall duration of the second cycle may be less than the overall duration of the first cycle. Alternatively (e.g., if the overall duration of the second cycle is the same as or greater than the overall duration of the first cycle), one or more of the emissions from the light emitters 424 during the second cycle may be staggered in time relative to one another. This may provide further robustness against crosstalk between channels since their emission/detection windows during the second cycle do not overlap with one another (e.g., as a result of the staggering in time).

By combining the longer range detection capabilities of the first cycle with the shorter range, but more crosstalk-resistant detection capabilities of the second cycle, an enhanced dataset (e.g., usable to generate one or more point clouds) may be produced. For example, a complete firing cycle of the lidar device 410 may include the first cycle followed by the second cycle. During the firing cycle, multiple emission/detection events during the first and second cycles may be recorded and combined to produce a dataset that mitigates the negative effects of crosstalk.

FIG. 6C illustrates a firing diagram for a first cycle (e.g., the first cycle illustrated and described with reference to FIG. 6A). A "1" indicates that the respective channel is emitting a light signal at a specified point in time, whereas a "0" indicates that the respective channel is refraining from emitting a light signal. Hence, as illustrated in FIG. 6C, each of the light emitters 424 in each of the channels of the lidar device 410 may be fired simultaneously. Thereafter, a single listening window with a duration sufficient for relatively distant objects may be used by the light detectors 426 of the channels of the lidar device 410. For example, a listening window of between 2.0 μs and 3.0 μs (e.g., 2.5 μs, which corresponds to a distance of 375 m) may be used. By firing groups of light emitters 424 in multiple channels of the lidar device 410 simultaneously (e.g., by firing all of the light emitters 424 in all of the channels of the lidar device 410 simultaneously, as illustrated in FIG. 6C), adverse effects of internal reflections within the lidar device 410 may be lessened. For example, after firing a light emitter 424, there may be a brief period where reflections off of internal components of the lidar device 410 are detected by one or more light detectors 426 of the lidar device 410. Such detected internal reflections may effectively prevent those light detectors 426 from detecting signals reflected from the surrounding environment (i.e., effectively blind the light detectors 426) during that brief period (e.g., and for an additional period thereafter due to potential saturation of the light detector(s) 426). By firing multiple light emitters 424 simultaneously, the time periods for internal reflections based on those light emitters 424 firing can overlap, thereby reducing the overall time that light detector(s) 426 within the lidar device 410 spend blinded (e.g., when compared to an alternative sequential firing sequence).

FIG. 6D, on the other hand, illustrates a firing diagram for a second cycle (e.g., the second cycle illustrated and described with reference to FIG. 6B). As illustrated in FIG. 6D, the second cycle may include multiple firing times and multiple corresponding listening windows. During each firing time, only a single channel may emit a light signal. For example, as illustrated, during a first firing time of the second cycle, the light emitter 424 of Channel 0 may emit a light signal. After Channel 0 emits a light signal, the light detectors 426 of the lidar device 410 may attempt to detect reflected signals for a listening window with a duration sufficient for relatively close objects. For example, a listening window of between 0.3 μs and 0.7 υs (e.g., 0.5 μs, which corresponds to a distance of 75 m) may be used. Thereafter, during a second firing time of the second cycle, the light emitter 424 of Channel 2 may emit a light signal. After Channel 2 emits a light signal, the light detectors 426 of the lidar device 410 may again attempt to detect reflected signals for a listening window (e.g., a listening window having the same duration as the previous listening window or a different duration). This process may continue with Channel 4, then Channel 6, then Channel 8, then Channel 10, then Channel 12, and finally Channel 14. This is indicated in FIG. 6D by the three dots adjacent to the fifth listening window.

In alternate embodiments, every second channel may be fired sequentially during sequential firing times until a total time allotted for the second cycle has expired (e.g., if 3.0 μs is allotted for the second cycle, only six firing times/listening windows of 0.5 μs each may be used). The channels may be selected such that the channels used during the second cycle are uniformly distributed among the light detectors 426 of the lidar device 410. Additionally or alternatively, in some embodiments, the channels (e.g., Channel 0 through Channel 15) may be fired during the second cycle in an interlaced fashion (e.g., Channel 0, then Channel 2, then Channel 4, then Channel 6, then Channel 8, then Channel 10, then Channel 12, then Channel 14, then Channel 1, then Channel 3, then Channel 5, then Channel 7, then Channel 9, then Channel 11, then Channel 13, then Channel 15 or Channel 0, then Channel 3, then Channel 6, then Channel 9, then Channel 12, then Channel 15, then Channel 1, then Channel 4, then Channel 7, then Channel 10, then Channel 13, then Channel 2, then Channel 5, then Channel 8, then Channel 11, then Channel 14). In still other embodiments, which channels are used during the second cycle may be determined based on a degree of fouling (e.g., condensation present, rain present, snow present, ice present, cracks present, insect residue present, and/or dust present) on one or more optics (e.g., windows, lenses, and/or mirrors) of the lidar device 410. For example, if there is a crack in an optical window that is located in front of the light emitter 424 or the light detector 426 of a given channel, that channel may be avoided during the second cycle. The degree of fouling may be based on a prior measurement made using the lidar device 410 or a different sensor and/or based on ambient weather conditions (e.g., a weather forecast, a present temperature, and/or doppler radar data) near the lidar device 410. After the second cycle has been completed, the detection results from the second cycle may be combined with the detection results of the first cycle to generate a dataset usable to produce one or more point clouds.

The channels used (e.g., iterated through in consecutive firing times/listening windows) during the second cycle may be selected according to a variety of methodologies. For example, one or more of the arrangements described above (e.g., every second channel, every third channel, and/or pairwise-interleaved channels) may be stored within a memory of a controller of the lidar device. Such a memory may include a predetermined list of which channels are fired in which order during the second cycle. In such embodiments, the sequence of channels used may be fixed and repeated across firing cycles. In some embodiments, for example, channels may be fired in a round-robin fashion during the second cycle of consecutive firing cycles according to the stored, predetermined list.

Alternatively, which channels are selected for use during the second cycle may be based on one or more previous firing cycles and/or based on the first cycle of the respective firing cycle. For example, by analyzing the first cycle, high-intensity return signals can be identified. Such high-intensity return signals may represent the presence of one or more high-reflectivity surfaces (e.g., retroreflectors) in the surrounding environment. Further, such high-reflectivity surfaces may be more likely to give rise to crosstalk. As such, the channel that detected the high-intensity return (e.g., and channels within a predetermined angle of that channel in the lidar device) during the first cycle may not be used during the second cycle. In still other embodiments, though (e.g., and perhaps more likely), those channels near detected high-intensity return signals may intentionally be probed during the second cycle. Because the channels nearby channels receiving high-intensity returns during the first cycle are the most likely to have been influenced by crosstalk during the first cycle, it may be most informative to separately probe those channels during the second cycle. As such, channels within a predetermined angular separation from a channel receiving a high-intensity return during the first cycle may be iterated over (e.g., sequentially fired during firing slots of the second cycle) during the second cycle.

In still other embodiments, channels may be selected for firing during the second cycle in order to provide as robust of coverage across the entire angular field of view as possible during the second cycle. For example, subsets of channels (e.g., pairs of channels, triplets of channels, quadruplets of channels) may be selected for each firing slot in the second cycle. Each of the channels within a given subset may be selected such that a minimum predetermined angular resolution condition is satisfied. For example, channels may be selected such that each channel within each subset of channels fired during each firing slot of the second cycle is separated by at least a predetermined number of degrees in azimuth and/or in elevation. The predetermined number of degrees may be determined based on one or more optical components of the lidar device (e.g., apertures, lenses, waveguides, mirrors, and/or windows).

Figure 6E:
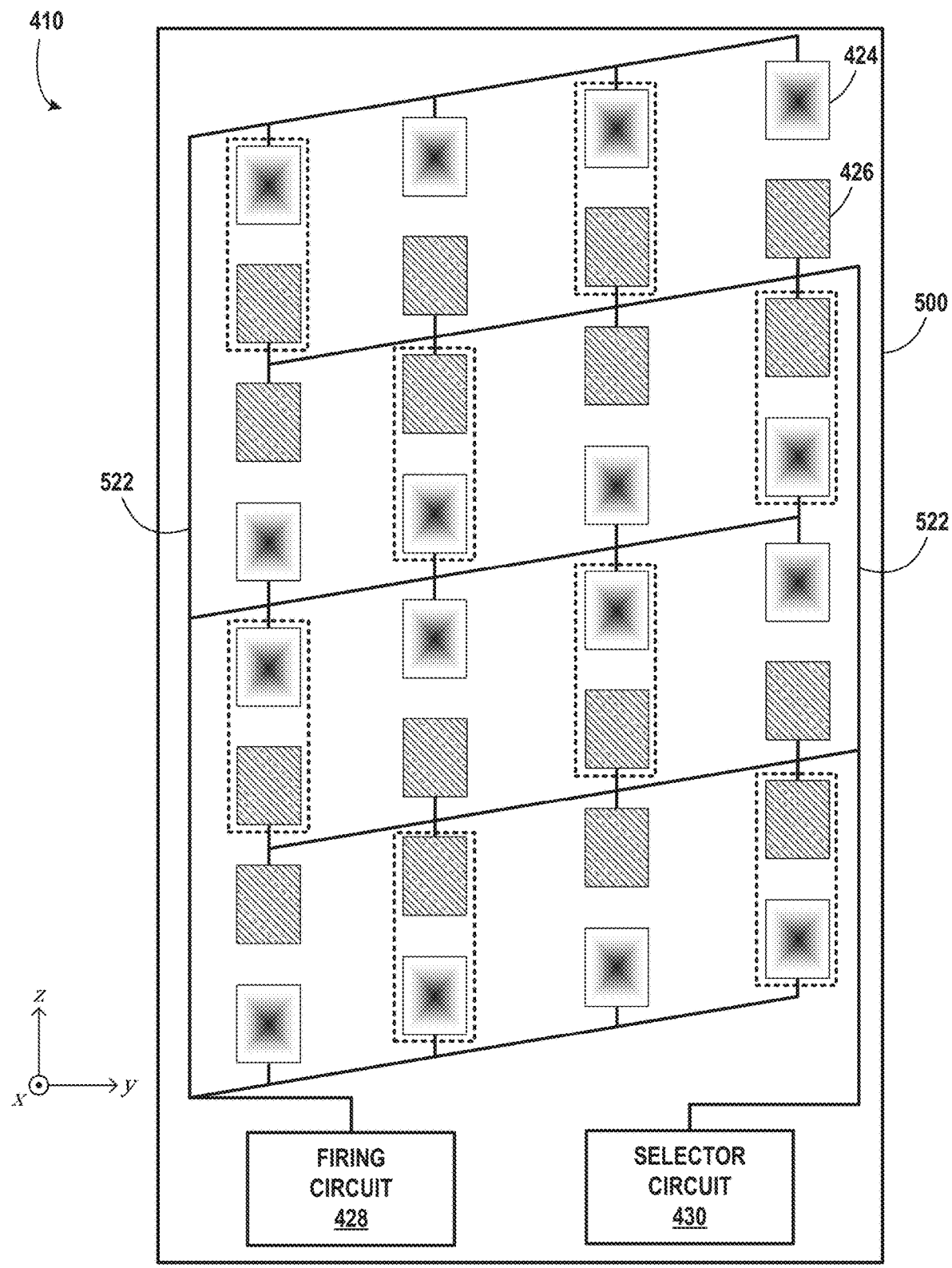
FIG. 6E is an illustration of pairs of light emitters and light detectors used during a second cycle, according to example embodiments.
Figure 6F:
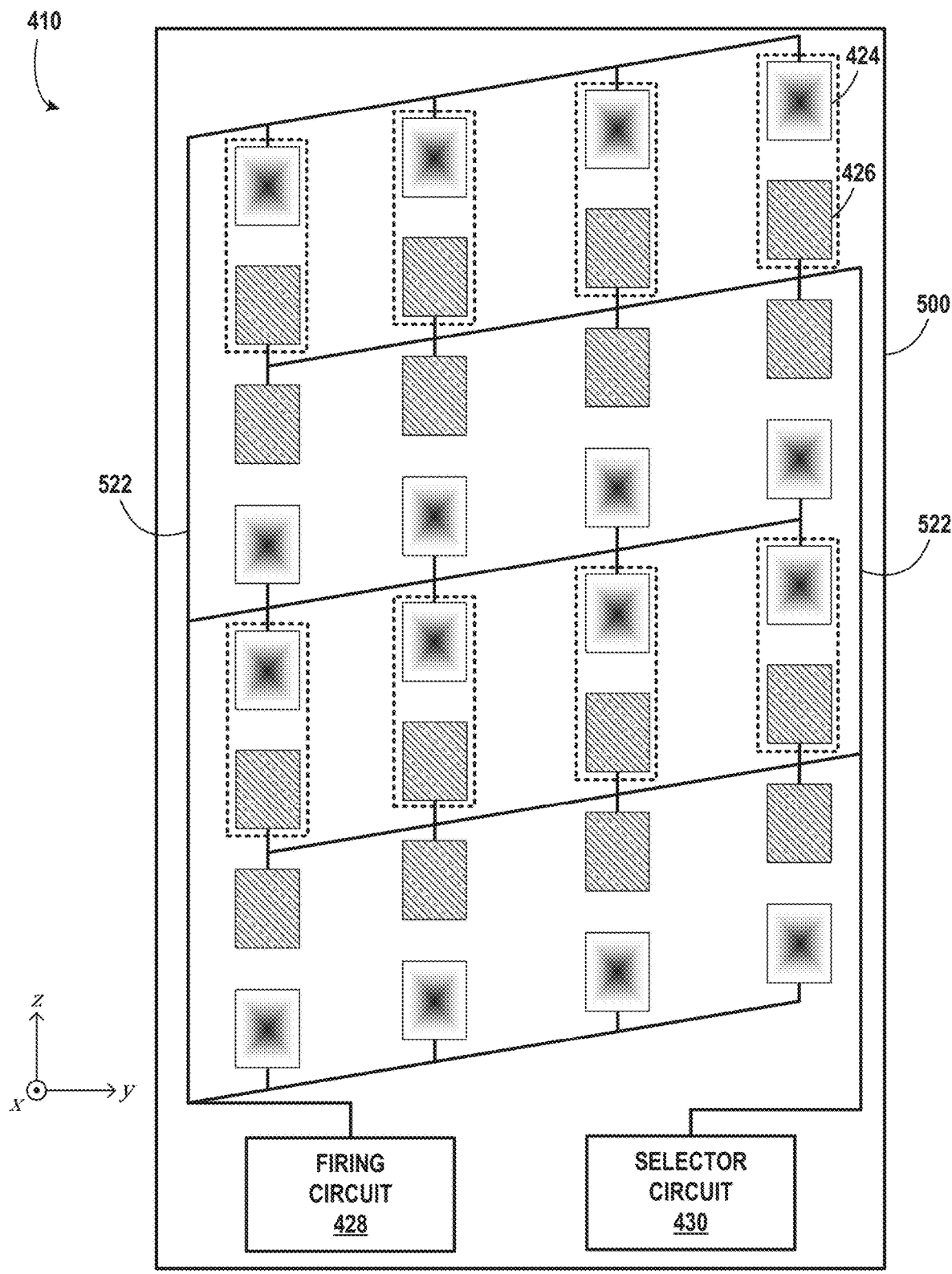
FIG. 6F is an illustration of pairs of light emitters and light detectors used during a second cycle, according to example embodiments.

FIG. 6E is an illustration of the channels in the lidar device 410 that may emit and detect light signals during the second cycle when emitting and detecting light signals according to the firing sequence illustrated and described with respect to FIG. 6D. For example, the channels used during the second cycle of FIG. 6D are shown inside boxes with dashed lines. As illustrated in FIG. 6E, the light detectors 426 used may be staggered with respect to one another (e.g., vertically along the z-direction) such that light reflected from an object in the surrounding environment (e.g., reflected during a previous listening window) that does not reach the detection plane of the lidar device 410 until a subsequent listening window and represents crosstalk may not be detected (e.g., as adjacent light detectors 426 within the lidar device 410 are not being used, even in sequential listening windows). It is understood that other arrangements of other light detectors 426 may be used during the second cycle (e.g., the arrangement illustrated in FIG. 6F).

Still further, it is understood that the firing sequence illustrated in FIG. 6D is an example and that other firing patterns for the second cycle are also possible and are contemplated herein. For example, each of the channels (rather than every second channel) may be configured to emit light during sequential firing times/listening windows (e.g., Channel 0, then Channel 1, then Channel 2, then Channel 3). Alternatively, every third channel (rather than every second channel) may be configured to emit light during sequential firing times/listening windows (e.g., Channel 0, then Channel 3, then Channel 6, then Channel 9). The spacing between channels fired during sequential time windows may be based on the physical spacing of the light detectors 426 in the lidar device 410. For example, how close the light detectors 426 are to one another may be used to determine how many subsequent channels are susceptible to crosstalk from adjacent channels, and only those channels that are not susceptible to crosstalk from one another may be selected for use in adjacent firing times/listening windows.

Figure 6G:
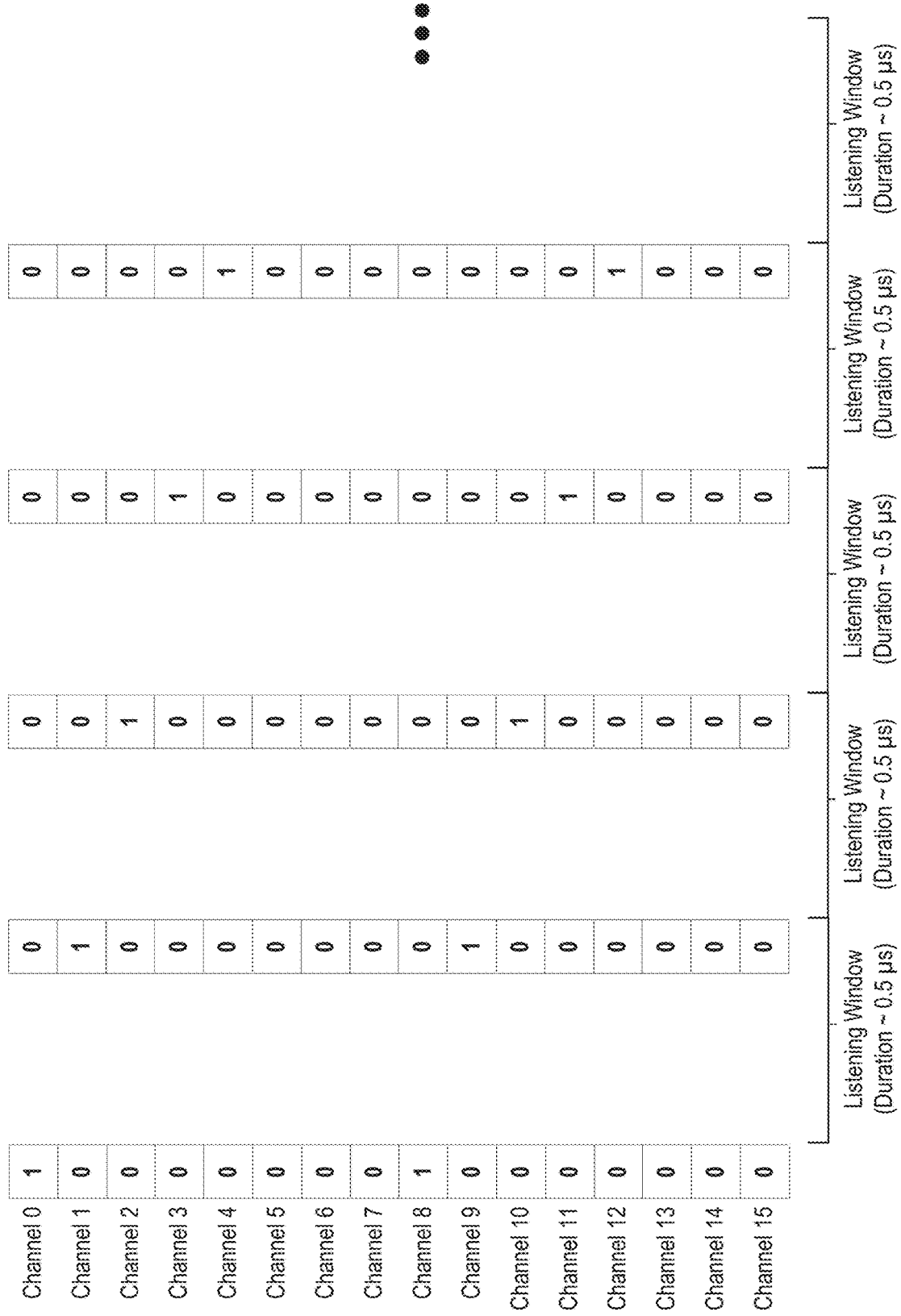
FIG. 6G is an illustration of a firing sequence used during a second cycle, according to example embodiments.

In still other embodiments, more than one channel may be used during each firing time/listening window during the second cycle. For example, as illustrated in FIG. 6G, two channels may be fired during each firing time in the second cycle. In some embodiments, the two channels selected for simultaneously firing may be as far away from one another within the lidar device 410 (e.g., by channel index and/or physical location within the lidar device 410) as possible. This may prevent crosstalk between the two channels used during the associated listening window. For example, as illustrated, during the first firing time/listening window of the second cycle, the light emitters 424 of Channel 0 and Channel 8 may emit light signals, whereas during the second firing time/listening window of the second cycle, the light emitters 424 of Channel 1 and Channel 9 may emit light signals, and so on. This may allow for a greater overall number of channels to be used during the second cycle (e.g., thereby increasing the resolution of the resulting dataset) but still preventing the possibility of crosstalk. Further, in some embodiments, the channels selected for simultaneous firing during the second cycle may be selected such that no crosstalk occurs between channels even when illuminating a highly reflective object (e.g., retroreflector) located at a maximum detectable range based on the duration of the second listening window. The phrase "such that no crosstalk occurs between channels" is used throughout this disclosure. It is understood that, while embodiments which provide literally no crosstalk between channels are clearly contemplated, embodiments that provide substantially reduced crosstalk are also contemplated by this phrase. For example, in some embodiments, there may exist a minimum threshold intensity used for detection by light detector(s) of a lidar device. Below that minimum threshold intensity, a detection event may not be registered (e.g., by the light detector(s) and/or by a computing device analyzing detection data from the light detector(s)). In such embodiments, then, the phrase "such that no crosstalk occurs between channels" may correspond to a level of crosstalk between channels that is less than the minimum threshold intensity (e.g., while still maintaining a crosstalk signal between channels that has non-zero intensity).

Figure 6H:
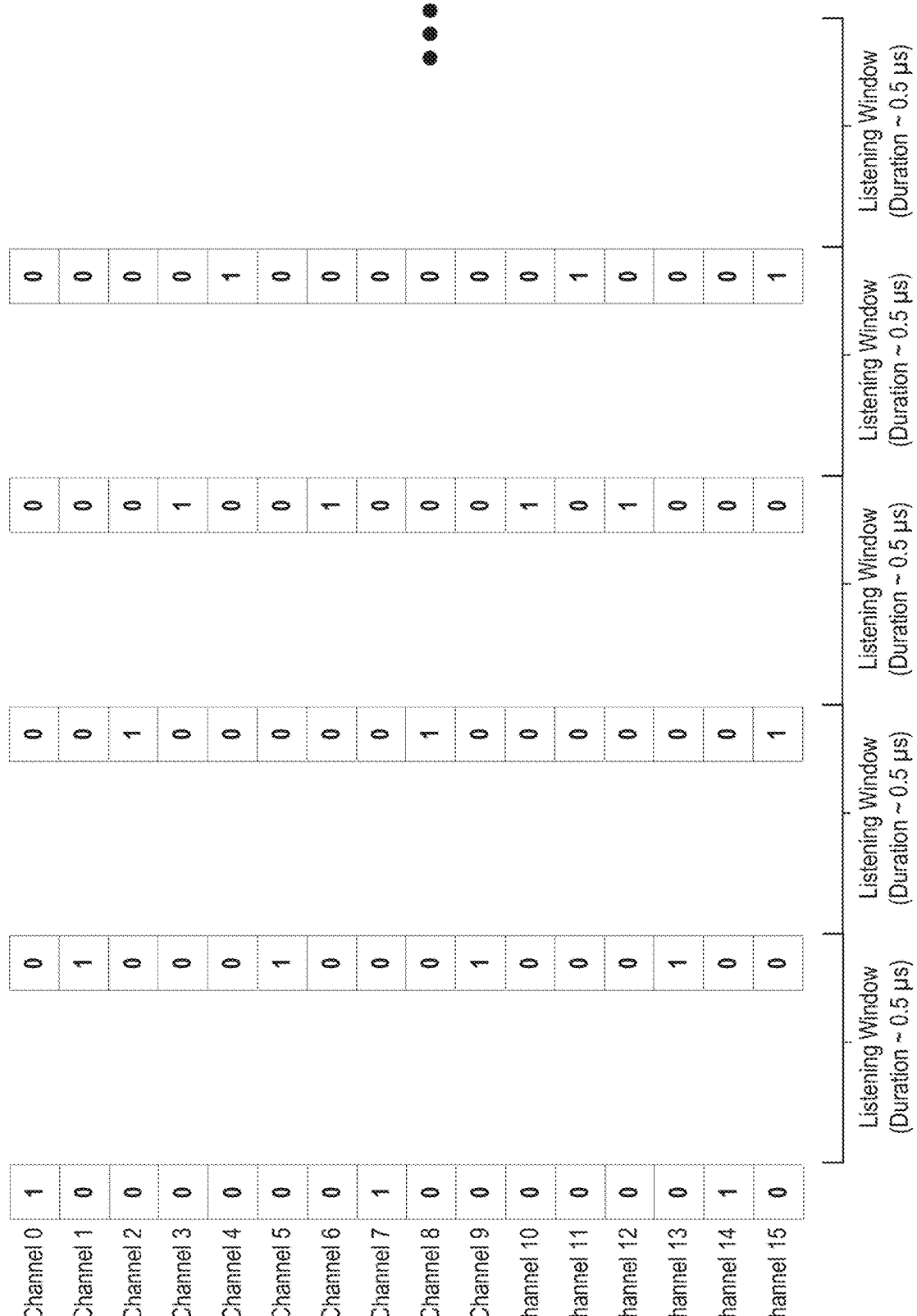
FIG. 6H is an illustration of a firing sequence used during a second cycle, according to example embodiments.

In still other embodiments, three channels, four channels, five channels, etc. may be configured to emit/detect light signals during each firing time/listening window. Still further, in some embodiments different numbers of channels may be used during different portions of the second cycle. For example, as illustrated in FIG. 6H, Channel 0, Channel 7, and Channel 14 may be used during the first firing time/listening window of the second cycle; followed by Channel 1, Channel 5, Channel 9, and Channel 13 during the second firing time/listening window of the second cycle; followed by Channel 2, Channel 8, and Channel 15 during the third firing time/listening window of the second cycle; etc. It is understood that other embodiments for the firing sequence of the second cycle are also possible and are contemplated herein. For example, the duration of sequential listening windows of the second cycle may vary from listening window to listening window (e.g., a 0.3 µs listening window, followed by a 0.5 µs listening window, followed by a 0.7 µs listening window, followed by a 0.5 µs listening window, followed by a 0.3 µs listening window).

Figure 7A:
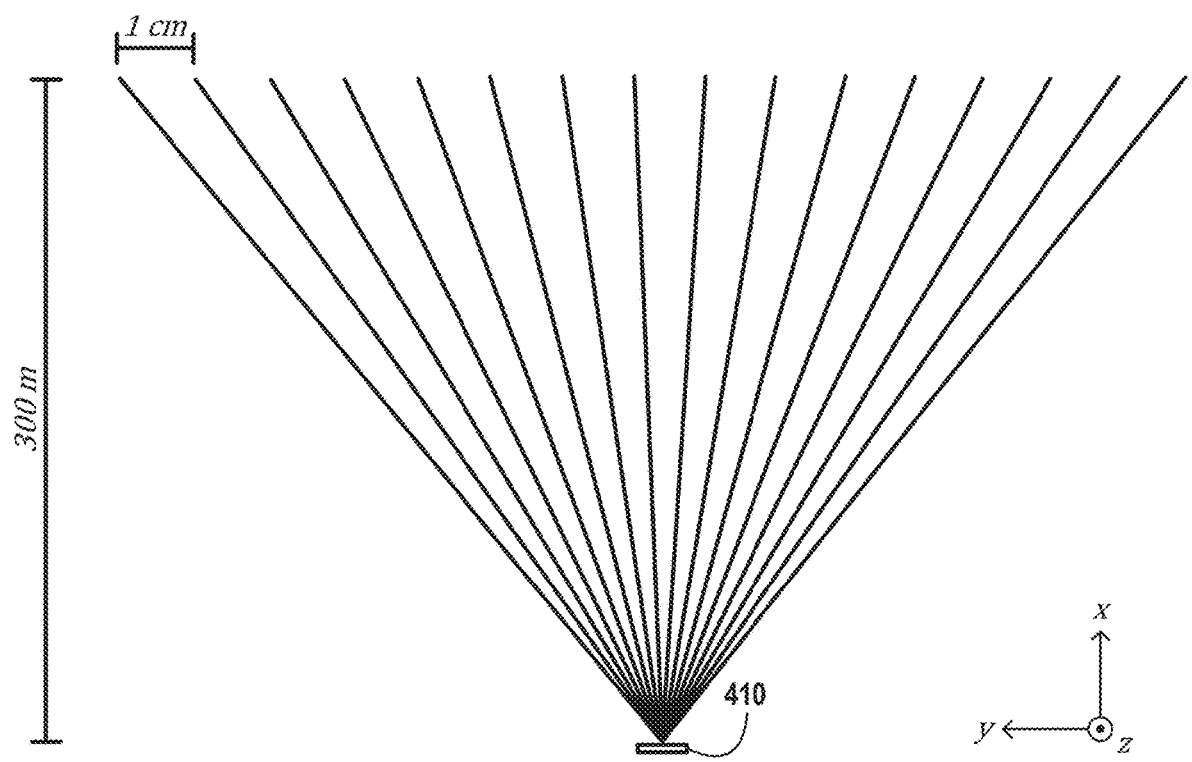
FIG. 7A is an illustration of an illumination pattern with a first angular resolution, according to example embodiments.
Figure 7B:
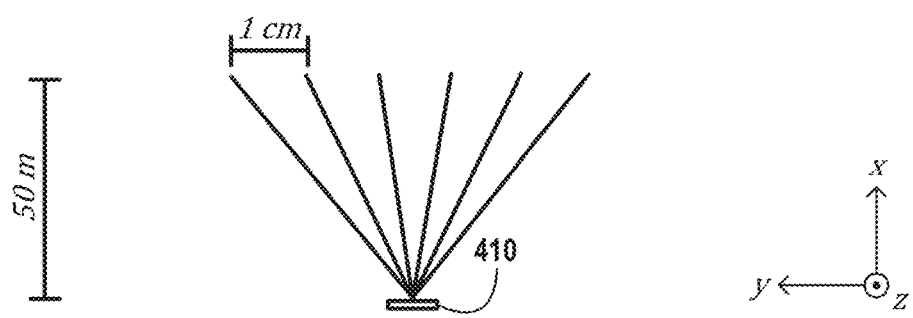
FIG. 7B is an illustration of an illumination pattern with a second angular resolution, according to example embodiments.

Embodiments described herein may make use of the fact that the channels of the lidar device 410 may be linearly over-resolved (i.e., have a higher resolution than necessary) when detecting nearby objects in the surrounding environment. This concept is illustrated in FIGS. 7A and 7B. FIG. 7A illustrates the lidar device 410 emitting light signals with a first angular resolution during a first cycle, while FIG. 7B illustrates the lidar device 410 emitting light signals with a second angular resolution during a second cycle. As illustrated, the first angular resolution of FIG. 7A (e.g., the number of emitted light signals per degree) is higher than the second angular resolution of FIG. 7B. Further, the listening window for the first cycle may correspond to a greater range than the listening window for the second cycle. For example, as illustrated, the listening window for the first cycle may correspond to 300 m, while the listening window for the second cycle may correspond to 50 m (though the same principle being illustrated would apply with different ranges than those illustrated). As illustrated, the linear resolution (e.g., represented by the line corresponding to 1 cm along the y-direction in FIGS. 7A and 7B) may be the same for the two emission patterns, despite the lower second angular resolution for the emission pattern of the second cycle. In other words, both emission patterns may be capable of resolving objects down to 1 cm at their respective ranges, even though they do not exhibit the same angular resolution. As such, the results from the second cycle for nearby objects may still be usable even when dropping out certain light signals from the emission pattern to prevent crosstalk.

Figure 8A:
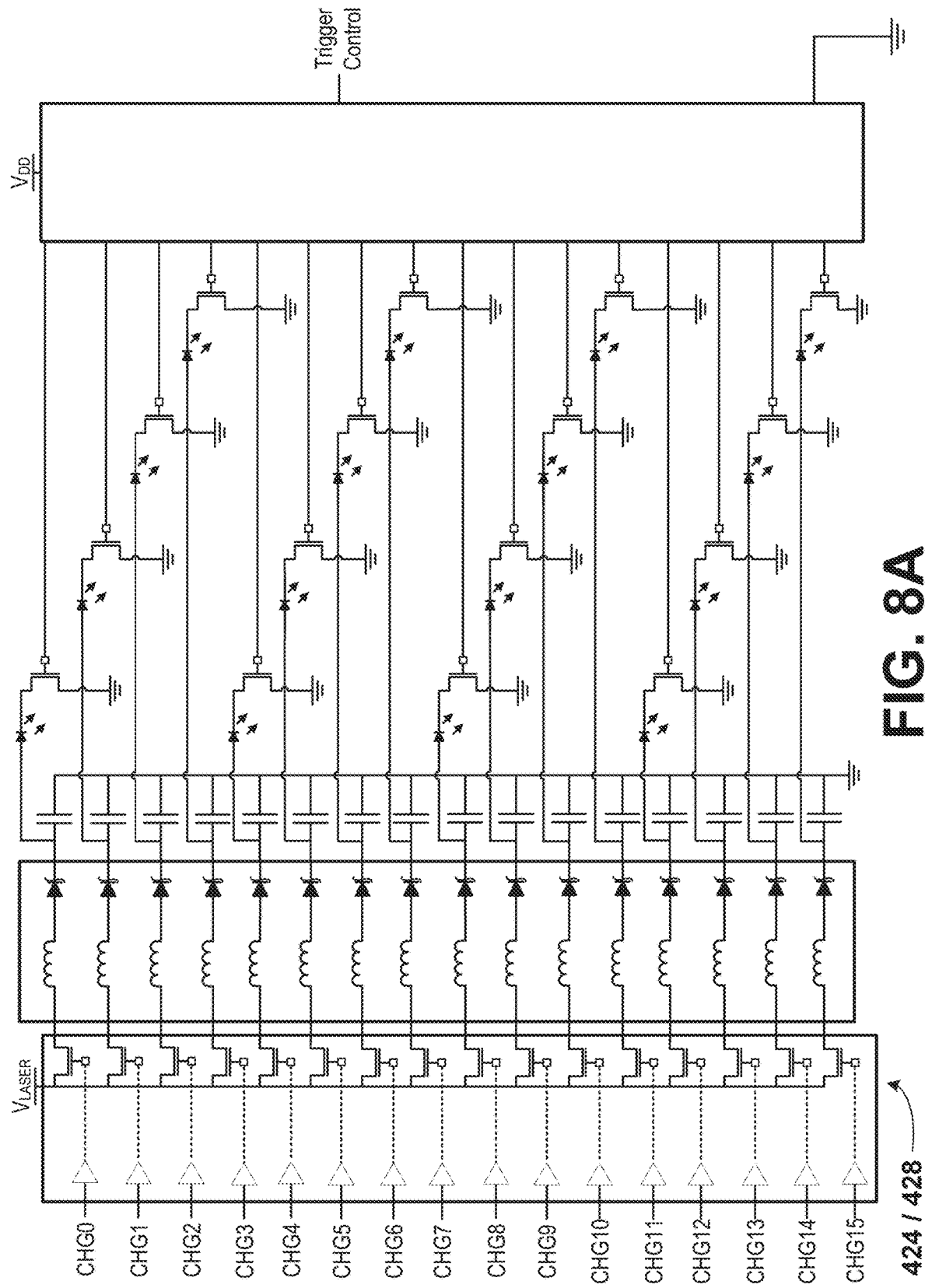
FIG. 8A is a schematic illustration of a firing circuit and associated light emitters, according to example embodiments.

In some embodiments, in order to generate the different firing patterns used during the first cycle and the second cycle (e.g., as illustrated in FIGS. 6A and 6B), a firing circuit may be designed to accommodate both the first cycle firing sequence and the second circle firing sequence. As an example, FIG. 8A illustrates a firing circuit 428 along with the associated light emitters 424 of a lidar device (e.g., the lidar device 410 shown and described with reference to FIG. 4B). As illustrated in FIG. 8A, each channel (e.g., Channel 0 through Channel 15) may have a corresponding signal line (e.g., CHG0 through CHG15) that can be used to select whether that channel will be fired during a given firing time. Those signal lines can be used to flip a charging switch (e.g., a transistor) in order to charge a respective capacitor (e.g., to a firing voltage, $V_{LASER}$) for the channel in question. Then, at the desired firing time, a Trigger Control signal can be used to cause one or more of the light emitters 424 (e.g., laser diodes) to fire by closing a firing switch (e.g., a transistor) so as to allow current to flow from the capacitor through the respective light emitter 424.

Figure 8B:
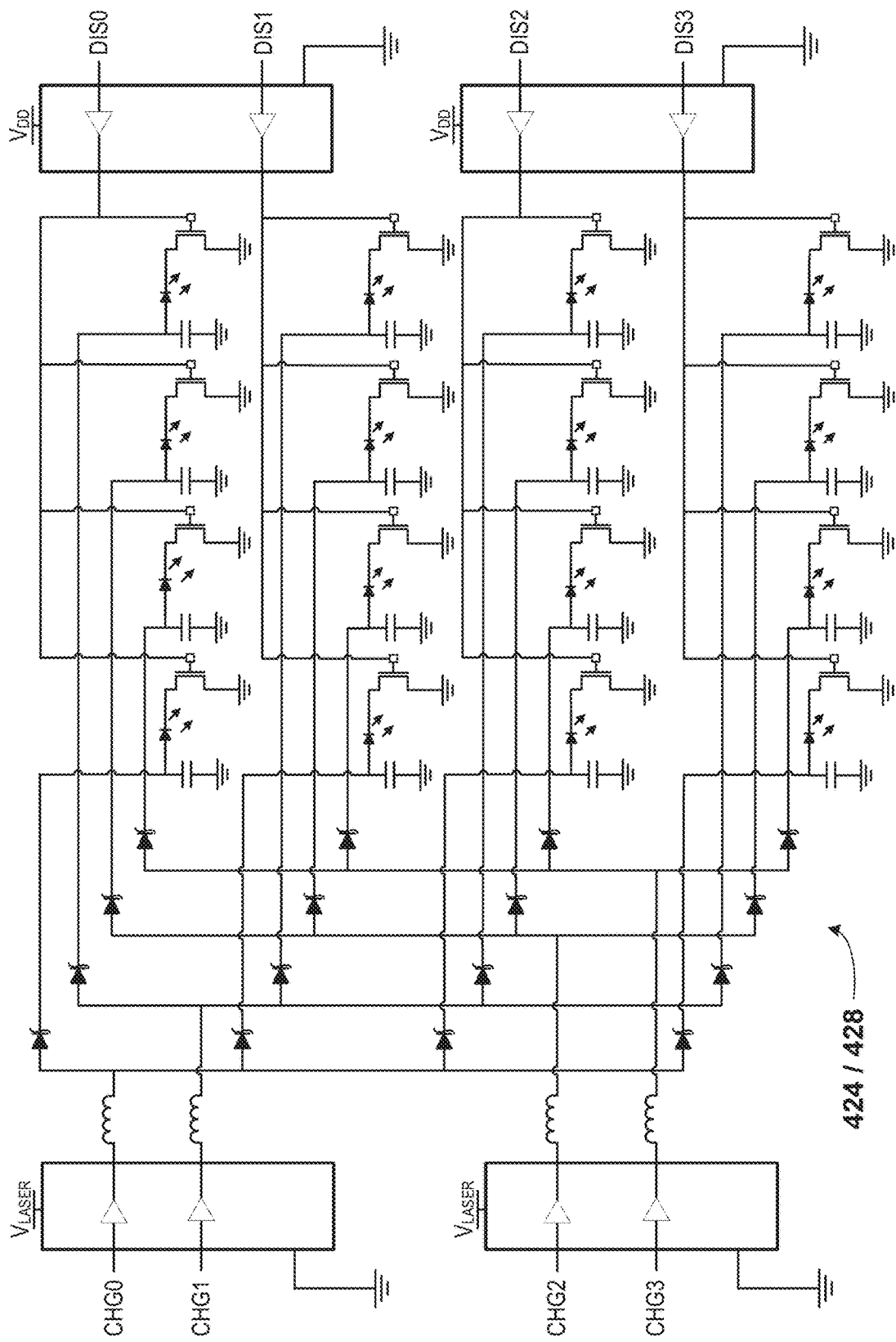
FIG. 8B is a schematic illustration of a firing circuit and associated light emitters, according to example embodiments.

It is understood that FIG. 8A is provided solely as an example and that other firing circuits 428 are also possible and are contemplated herein. As just one alternative, if the light emitters 424 were to be fired in sets of four (e.g., during the second cycle), the firing circuit 428 and light emitter 424 arrangement of FIG. 8B may be used. Unlike the firing circuit 428 of FIG. 8A, the firing circuit 428 of FIG. 8B may only include four signal lines (e.g., CHG0 through CHG 3). Each of the signal lines can be used to select whether a specific group of four channels will be fired during a given firing time/associated listening window. As illustrated in FIG. 8B, the signal lines may be used to charge four respective capacitors (e.g., to a firing voltage, $V_{LASER}$) for four respective channels. Then, at the desired firing time, trigger-control (i.e., discharge) signals (e.g., DIS0 through DIS3) signal can be used to cause one or more of the groups of four light emitters 424 (e.g., laser diodes) to fire by closing, for a given group of light emitters 424, four corresponding firing switches (e.g., transistors) so as to allow current to flow from the charged capacitors through the respective light emitters 424 in the group.

Figure 9:
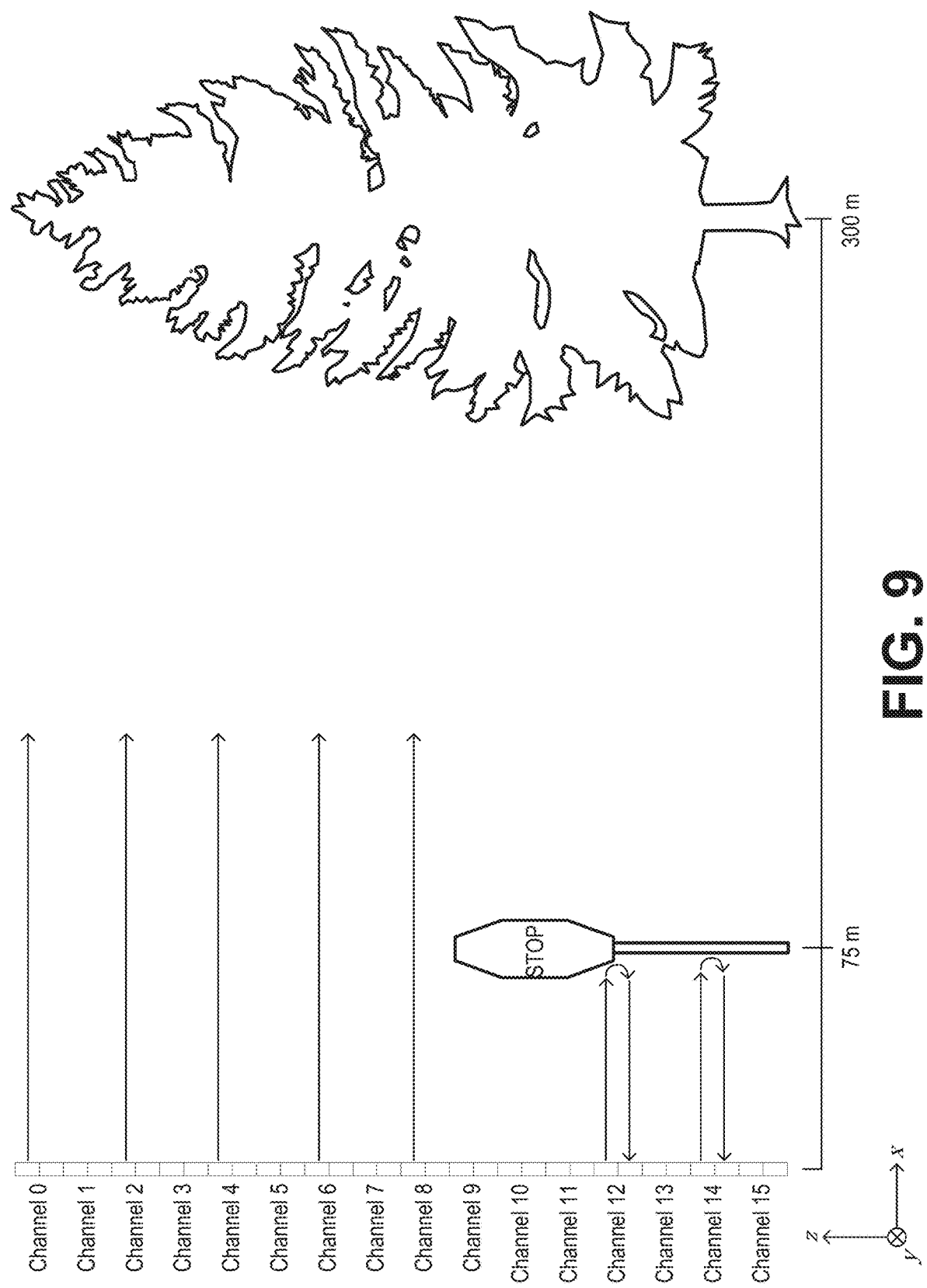
FIG. 9 is an illustration of a second group of emitted light signals and a second group of reflected light signals during a second cycle, according to example embodiments.

The techniques used to mitigate or eliminate crosstalk described above may be augmented by additional or alternative techniques. As one example of an additional crosstalk mitigation technique that could be employed in conjunction with the first cycle/second cycle techniques described above, the identification of certain objects in the surrounding environment could be used to prevent crosstalk in future detection cycles. For example, highly reflective (e.g., retroreflective) objects in the surrounding environment can generate high-intensity reflections, which can likely give rise to crosstalk. As such, when a highly reflective object is identified in a given detection cycle (e.g., based on the intensity of the reflection detected from the object), the lidar device 410 may refrain from emitting light signals toward that object in future detection cycles. For example, FIG. 9 illustrates an alternative set of potential signals emitted during a second cycle. The signals emitted (e.g., sequentially during different firing times/listening windows) during the second cycle of FIG. 9 may be similar to the signals emitted during the second cycle of FIG. 6B. However, the traffic sign illustrated in FIGS. 6B and 9 may have highly reflective portions (e.g., the lettering of the sign may include retroreflectors). As such, to further mitigate crosstalk, the embodiment illustrated in FIG. 9 may also refrain from emitting light signals toward the portion of the scene that includes the highly reflective portions of the traffic sign (e.g., in FIG. 9, unlike in FIG. 6B, the light emitter 424 of Channel 10 may refrain from emitting light signals during the second cycle). Highly reflective objects in the surrounding environment may be identified based on light signals emitted into the surrounding environment for the purposes of detection during one or more previous detection cycles. Additionally or alternatively, highly reflective objects in the surrounding environment may be identified based on calibration signals emitted into the surrounding environment by the light emitters 424 of the lidar device 410 for the purpose of identifying highly reflective objects before a run-time emission/detection is to be performed.

In addition to or instead of modulating the listening windows and/or angular resolutions associated with the first cycle/second cycle as described above, power modulation could also be performed to disambiguate crosstalk signals from detection signals. For example, a lower emission power for light signals emitted during the second cycle could be used than for light signals emitted during the first cycle. This emission power dichotomy may conserve energy (e.g., as the emitted light signals do not have to travel as far during the second cycle because the listening window/range is shorter), reduce charging time (e.g., for capacitors used to fire the light emitters 424 based on an RC time constant or RLC time constant of a charging circuit), reduce the likelihood of inducing crosstalk in adjacent channels (e.g., due to lower-intensity reflections as a result of reduced emission power), reduce the amount of dynamic range required of the light detectors/receiver of the lidar device, and/or prevent saturation of the light detectors during the second cycle. In some embodiments, for example, the emission power used during the second cycle may be less than 75%, less than 50%, less than 25%, or less than 10% of the emission power used during the first cycle.

Regardless of the differences employed between the first cycle and second cycle, embodiments described herein also include techniques to combine the detection events of the first cycle with the detection events of the second cycle. In some embodiments, the lidar device 410 may simply produce a dataset that includes two segments of data; one segment usable to generate a first point cloud (e.g., corresponding to the first cycle of emitted/detected signals) and one segment usable to generate a second point cloud (e.g., corresponding to the second cycle of emitted/detected signals). In other embodiments, the lidar device 410 (e.g., a controller 416 of the lidar device 410) may determine, for each channel in use during both the first cycle and second cycle, an apparent target distance based on the detection event during the first cycle and an apparent target distance based on the detection event during the second cycle. The lidar device 410 (e.g., a controller 416 of the lidar device 410) may then determine the difference between the two apparent distances for each channel. Then, for each channel, the lidar device 410 (e.g., a controller 416 of the lidar device 410) may compare the difference in apparent distances to a threshold difference value (e.g., between 0.1 and 5.0 m, such as 0.5 m, 1.0 m, or 2.5 m) and, if the difference is less than the threshold difference value, include the apparent distance from one of the cycles (e.g., the second cycle or the first cycle) in a dataset that is usable to generate a single point cloud that represents a combination of detection events during the two cycles. If the difference value is greater than the threshold difference, the lidar device 410 (e.g., a controller 416 of the lidar device 410) may instead exclude both of the apparent distances, include one of the apparent distances by default, calculate a hybrid distance that represents some combination of the two measurements and include the hybrid distance (e.g., with an associated confidence level based on the difference value), etc.

Figure 10:
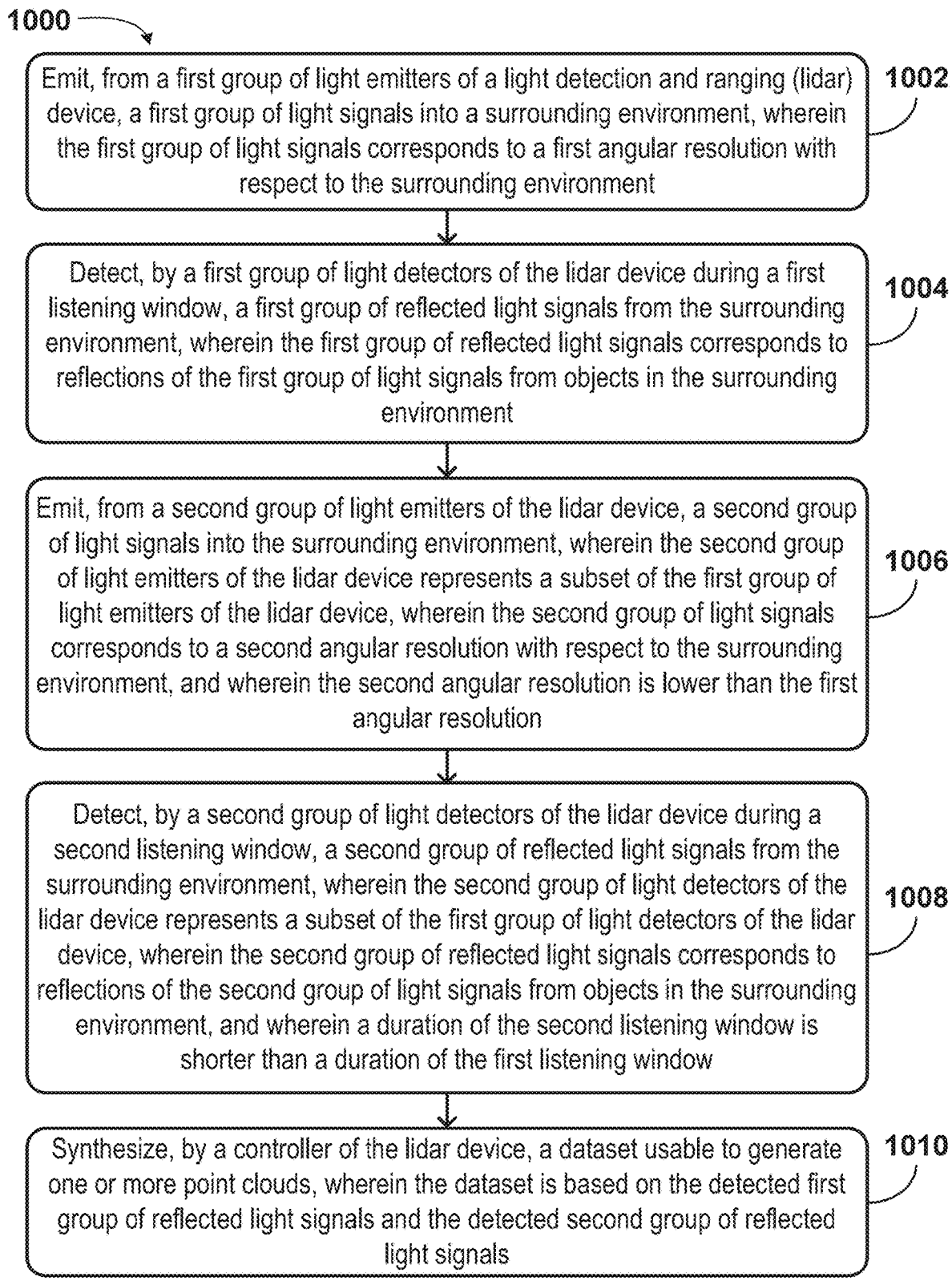
FIG. 10 is a flowchart diagram illustrating a method, according to example embodiments.

FIG. 10 is a flowchart diagram of a method 1000, according to example embodiments. In some embodiments, the method 1000 may be performed to mitigate crosstalk from neighboring channels within a lidar device. In some embodiments, the method 1000 may be performed by a system that includes a lidar device (e.g., the lidar device 410 illustrated in FIGS. 4B and 5A).

At block 1002, the method 1000 may include emitting, from a first group of light emitters of a light detection and ranging (lidar) device, a first group of light signals into a surrounding environment. The first group of light signals may correspond to a first angular resolution with respect to the surrounding environment.

At block 1004, the method 1000 may include detecting, by a first group of light detectors of the lidar device during a first listening window, a first group of reflected light signals from the surrounding environment. The first group of reflected light signals may correspond to reflections of the first group of light signals from objects in the surrounding environment.

At block 1006, the method 1000 may include emitting, from a second group of light emitters of the lidar device, a second group of light signals into the surrounding environment. The second group of light emitters of the lidar device may represent a subset of the first group of light emitters of the lidar device. The second group of light signals may correspond to a second angular resolution with respect to the surrounding environment. The second angular resolution may be lower than the first angular resolution.

At block 1008, the method 1000 may include detecting, by a second group of light detectors of the lidar device during a second listening window, a second group of reflected light signals from the surrounding environment. The second group of light detectors of the lidar device may represent a subset of the first group of light detectors of the lidar device. The second group of reflected light signals may correspond to reflections of the second group of light signals from objects in the surrounding environment. The duration of the second listening window may be shorter than the duration of the first listening window.

At block 1010, the method 1000 may include synthesizing, by a controller of the lidar device, a dataset usable to generate one or more point clouds. The dataset may be based on the detected first group of reflected light signals and the detected second group of reflected light signals.

In some embodiments, the method 1000 may also include emitting, from a third group of light emitters of the lidar device, a third group of light signals into the surrounding environment. The third group of light emitters of the lidar device may represent a different subset of the first group of light emitters of the lidar device than the second group of light emitters. The third group of light signals may correspond to a third angular resolution with respect to the surrounding environment. The third angular resolution may be the same as the second angular resolution. The method 1000 may also include detecting, by a third group of light detectors of the lidar device during a third listening window, a third group of reflected light signals from the surrounding environment. The third group of light detectors of the lidar device may represent a different subset of the first group of light detectors of the lidar device than the second group of light detectors. The third group of reflected light signals may correspond to reflections of the third group of light signals from objects in the surrounding environment. The duration of the third listening window may be the same as the duration of the second listening window. The dataset may be based on the detected third group of reflected light signals.

In some embodiments of the method 1000, the third listening window may not overlap with the second listening window.

In some embodiments of the method 1000, the second group of light signals may include a plurality of light signals. The third group of light signals may include a plurality of light signals. The second group of light signals and the third group of light signals may be interlaced with respect to the surrounding environment.

In some embodiments of the method 1000, the second group of light detectors may include a plurality of light detectors. The second group of light detectors may be selected from the first group of light detectors so as to be uniformly distributed across the first group of light detectors.

In some embodiments of the method 1000, the second group of light detectors may be distributed sparsely enough across the first group of light detectors in space such that no crosstalk occurs between light detectors within the second group when illuminating a retroreflector located at a maximum detectable range with a light signal in the second group of light signals. The maximum detectable range may be based on the duration of the second listening window.

In some embodiments, the method 1000 may also include emitting, from each of the light emitters in the lidar device, a calibration light signal into the surrounding environment. Additionally, the method 1000 may include detecting, by each of the light detectors of the lidar device during a calibration listening window, a reflected calibration light signal from the surrounding environment. Each reflected calibration light signal may correspond to a reflection of one of the calibration light signals from an object in the surrounding environment. Further, the method 1000 may include identifying, based on the detected reflected calibration light signals, one or more light emitters within the lidar device for which the corresponding calibration light signal was reflected from a retroreflector in the surrounding environment. In addition, the method 1000 may include selecting the first group of light emitters of the lidar device from a set of all emitters in the lidar device. The first group of light emitters may correspond to those light emitters that were not identified as the one or more light emitters within the lidar device for which the corresponding calibration light signal was reflected from a retroreflector in the surrounding environment.

In some embodiments of the method 1000, the one or more light emitters within the lidar device for which the corresponding calibration light signal was reflected from a retroreflector in the surrounding environment may be identified based on a detected intensity of the corresponding detected reflected calibration light signal from the surrounding environment.

In some embodiments of the method 1000, emitting the first group of light signals into the surrounding environment may include emitting the first group of light signals into the surrounding environment using a first emission power. Emitting the second group of light signals into the surrounding environment may include emitting the second group of light signals into the surrounding environment using a second emission power. The second emission power may be less than the first emission power.

In some embodiments of the method 1000, the second emission power may be less than 25% of the first emission power.

In some embodiments of the method 1000, the dataset may be usable to generate a first point cloud and a second point cloud. The first point cloud may include data relating to the first group of detected reflected light signals. The second point cloud may include data relating to the second group of detected reflected light signals.

In some embodiments of the method 1000, synthesizing the dataset may include, for each of the detected reflected light signals in the second group of detected reflected light signals, determining a second target distance based on the respective detected reflected light signal. Synthesizing the dataset may also include, for each of the detected reflected light signals in the second group of detected reflected light signals, determining a first target distance based on a corresponding detected reflected light signal in the first group of detected reflected light signals. The corresponding detected reflected light signal in the first group of detected reflected light signals may have been detected by the same light detector within the lidar device. Additionally, synthesizing the dataset may include, for each of the detected reflected light signals in the second group of detected reflected light signals, determining a difference between the second target distance and the first target distance. Further, synthesizing the dataset may include, for each of the detected reflected light signals in the second group of detected reflected light signals, including the second target distance or the first target distance in the dataset if the difference is less than a threshold difference value.

In some embodiments of the method 1000, the threshold difference value may be between 0.1 m and 5.0 m.

In some embodiments of the method 1000, the duration of the first listening window may be between 2.0 μs and 3.0 μs. The duration of the second listening window may be between 0.3 μs and 0.5 μs.

In some embodiments, the method 1000 may also include determining which light emitters within the first group of light emitters to include within the second group of light emitters based on a degree of fouling of one or more optics of the lidar device.

In some embodiments of the method 1000, the degree of fouling may be determined based on a prior measurement using the lidar device or a different sensor.

In some embodiments of the method 1000, the degree of fouling may be determined based on ambient weather conditions near the lidar device.

In some embodiments of the method 1000, the dataset may include a plurality of points associated with each of the detected reflected light signals in the second group of detected reflected light signals. Each of the plurality of points may include a target distance. Each target distance may have an associated confidence level determined based on the detected reflected light signal in the second group of detected reflected light signals and a corresponding first detected reflected light signal in the first group of detected reflected light signals.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
    emitting, from a first group of light emitters of a light detection and ranging (lidar) device, a first group of light signals into a surrounding environment, wherein the first group of light signals corresponds to a first angular resolution with respect to the surrounding environment;
    detecting, by a first group of light detectors of the lidar device during a first listening window, a first group of reflected light signals from the surrounding environment, wherein the first group of reflected light signals corresponds to reflections of the first group of light signals from objects in the surrounding environment;
    emitting, from a second group of light emitters of the lidar device, a second group of light signals into the surrounding environment, wherein the second group of light emitters of the lidar device represents a subset of the first group of light emitters of the lidar device, wherein the second group of light signals corresponds to a second angular resolution with respect to the surrounding environment, and wherein the second angular resolution is lower than the first angular resolution;
    detecting, by a second group of light detectors of the lidar device during a second listening window, a second group of reflected light signals from the surrounding environment, wherein the second group of light detectors of the lidar device represents a subset of the first group of light detectors of the lidar device, wherein the second group of reflected light signals corresponds to reflections of the second group of light signals from objects in the surrounding environment, and wherein a duration of the second listening window is shorter than a duration of the first listening window; and
    synthesizing, by a controller of the lidar device, a dataset usable to generate one or more point clouds, wherein the dataset is based on the detected first group of reflected light signals and the detected second group of reflected light signals, and wherein synthesizing the dataset comprises, for each of the detected reflected light signals in the second group of detected reflected light signals:
        determining a second target distance based on the respective detected reflected light signal;
        determining a first target distance based on a corresponding detected reflected light signal in the first group of detected reflected light signals, wherein the corresponding detected reflected light signal in the first group of detected reflected light signals was detected by the same light detector within the lidar device;
        determining a difference between the second target distance and the first target distance; and
        including the second target distance or the first target distance in the dataset if the difference is less than a threshold difference value.

2. The method of claim 1, further comprising:
    emitting, from a third group of light emitters of the lidar device, a third group of light signals into the surrounding environment, wherein the third group of light emitters of the lidar device represents a different subset of the first group of light emitters of the lidar device than the second group of light emitters, wherein the third group of light signals corresponds to a third angular resolution with respect to the surrounding environment, and wherein the third angular resolution is the same as the second angular resolution; and
    detecting, by a third group of light detectors of the lidar device during a third listening window, a third group of reflected light signals from the surrounding environment, wherein the third group of light detectors of the lidar device represents a different subset of the first group of light detectors of the lidar device than the second group of light detectors, wherein the third group of reflected light signals corresponds to reflections of the third group of light signals from objects in the surrounding environment, wherein a duration of the third listening window is the same as the duration of the second listening window, and
    wherein the dataset is based on the detected third group of reflected light signals.

3. The method of claim 2, wherein the third listening window does not overlap with the second listening window.

4. The method of claim 2, wherein the second group of light signals comprises a plurality of light signals, wherein the third group of light signals comprises a plurality of light signals, and wherein the second group of light signals and the third group of light signals are interlaced with respect to the surrounding environment.

5. The method of claim 1, wherein the second group of light detectors comprises a plurality of light detectors, and wherein the second group of light detectors is selected from the first group of light detectors so as to be uniformly distributed across the first group of light detectors.

6. The method of claim 1, wherein the second group of light detectors is distributed across the first group of light detectors in space such that no crosstalk occurs between light detectors within the second group when illuminating a retroreflector located at a maximum detectable range with a light signal in the second group of light signals, and wherein the maximum detectable range is based on the duration of the second listening window.

7. The method of claim 1, further comprising:
    emitting, from each of the light emitters in the lidar device, a calibration light signal into the surrounding environment;
    detecting, by each of the light detectors of the lidar device during a calibration listening window, a reflected calibration light signal from the surrounding environment, wherein each reflected calibration light signal corresponds to a reflection of one of the calibration light signals from an object in the surrounding environment;
    identifying, based on the detected reflected calibration light signals, one or more light emitters within the lidar device for which the corresponding calibration light signal was reflected from a retroreflector in the surrounding environment; and selecting the first group of light emitters of the lidar device from a set of all emitters in the lidar device, wherein the first group of light emitters corresponds to those light emitters that were not identified as the one or more light emitters within the lidar device for which the corresponding calibration light signal was reflected from a retroreflector in the surrounding environment.

8. The method of claim 7, wherein the one or more light emitters within the lidar device for which the corresponding calibration light signal was reflected from a retroreflector in the surrounding environment are identified based on a detected intensity of the corresponding detected reflected calibration light signal from the surrounding environment.

9. The method of claim 1, wherein emitting the first group of light signals into the surrounding environment comprises emitting the first group of light signals into the surrounding environment using a first emission power, wherein emitting the second group of light signals into the surrounding environment comprises emitting the second group of light signals into the surrounding environment using a second emission power, and wherein the second emission power is less than the first emission power.

10. The method of claim 9, wherein the second emission power is less than 25% of the first emission power.

11. The method of claim 1, wherein the dataset is usable to generate a first point cloud and a second point cloud, wherein the first point cloud comprises data relating to the first group of detected reflected light signals, and wherein the second point cloud comprises data relating to the second group of detected reflected light signals.

12. The method of claim 1, wherein emitting the second group of light signals into the surrounding environment comprises staggering the second group of light signals relative to one another in time.

13. The method of claim 12, wherein the threshold difference value is between 0.1 m and 5.0 m.

14. The method of claim 1, wherein the duration of the first listening window is between 2.0 μs and 3.0 μs, and wherein the duration of the second listening window is between 0.3 μs and 0.5 μs.

15. The method of claim 1, further comprising determining which light emitters within the first group of light emitters to include within the second group of light emitters based on a degree of fouling of one or more optics of the lidar device.

16. The method of claim 15, wherein the degree of fouling is determined based on a prior measurement using the lidar device or a different sensor.

17. The method of claim 15, wherein the degree of fouling is determined based on ambient weather conditions near the lidar device.

18. The method of claim 1, wherein the dataset comprises a plurality of points associated with each of the detected reflected light signals in the second group of detected reflected light signals, wherein each of the plurality of points comprises a target distance, and wherein each target distance has an associated confidence level determined based on the detected reflected light signal in the second group of detected reflected light signals and a corresponding first detected reflected light signal in the first group of detected reflected light signals.

19. A light detection and ranging (lidar) device comprising:
a first group of light emitters configured to emit a first group of light signals into a surrounding environment, wherein the first group of light signals corresponds to a first angular resolution with respect to the surrounding environment;
a first group of light detectors configured to detect, during a first listening window, a first group of reflected light signals from the surrounding environment, wherein the first group of reflected light signals corresponds to reflections of the first group of light signals from objects in the surrounding environment;
a second group of light emitters configured to emit a second group of light signals into the surrounding environment, wherein the second group of light emitters of the lidar device represents a subset of the first group of light emitters of the lidar device, wherein the second group of light signals corresponds to a second angular resolution with respect to the surrounding environment, and wherein the second angular resolution is lower than the first angular resolution;
a second group of light detectors configured to detect, during a second listening window, a second group of reflected light signals from the surrounding environment, wherein the second group of light detectors of the lidar device represents a subset of the first group of light detectors of the lidar device, wherein the second group of reflected light signals corresponds to reflections of the second group of light signals from objects in the surrounding environment, and wherein a duration of the second listening window is shorter than a duration of the first listening window; and
a controller configured to synthesize a dataset usable to generate one or more point clouds, wherein the dataset is based on the detected first group of reflected light signals and the detected second group of reflected light signals, and wherein synthesizing the dataset comprises, for each of the detected reflected light signals in the second group of detected reflected light signals:
determining a second target distance based on the respective detected reflected light signal;
determining a first target distance based on a corresponding detected reflected light signal in the first group of detected reflected light signals, wherein the corresponding detected reflected light signal in the first group of detected reflected light signals was detected by the same light detector within the lidar device;
determining a difference between the second target distance and the first target distance; and
including the second target distance or the first target distance in the dataset if the difference is less than a threshold difference value.

20. A system comprising:
a light detection and ranging (lidar) device comprising:
a first group of light emitters configured to emit a first group of light signals into a surrounding environment, wherein the first group of light signals corresponds to a first angular resolution with respect to the surrounding environment;
a first group of light detectors configured to detect, during a first listening window, a first group of reflected light signals from the surrounding environment, wherein the first group of reflected light signals corresponds to reflections of the first group of light signals from objects in the surrounding environment;
a second group of light emitters configured to emit a second group of light signals into the surrounding environment, wherein the second group of light emitters of the lidar device represents a subset of the first group of light emitters of the lidar device, wherein the second group of light signals corresponds to a second angular resolution with respect to the surrounding environment, and wherein the second angular resolution is lower than the first angular resolution;

a second group of light detectors configured to detect, during a second listening window, a second group of reflected light signals from the surrounding environment, wherein the second group of light detectors of the lidar device represents a subset of the first group of light detectors of the lidar device, wherein the second group of reflected light signals corresponds to reflections of the second group of light signals from objects in the surrounding environment, and wherein a duration of the second listening window is shorter than a duration of the first listening window; and a lidar controller configured to synthesize a dataset usable to generate one or more point clouds, wherein the dataset is based on the detected first group of reflected light signals and the detected second group of reflected light signals, and wherein synthesizing the dataset comprises, for each of the detected reflected light signals in the second group of detected reflected light signals:

determining a second target distance based on the respective detected reflected light signal;

determining a first target distance based on a corresponding detected reflected light signal in the first group of detected reflected light signals, wherein the corresponding detected reflected light signal in the first group of detected reflected light signals was detected by the same light detector within the lidar device;

determining a difference between the second target distance and the first target distance; and including the second target distance or the first target distance in the dataset if the difference is less than a threshold difference value; and a system controller configured to:

receive the dataset from the lidar controller; and generate the one or more point clouds based on the dataset.

* * * * *